Sept. 8, 1964  R. DE LIBAN  3,147,817
GUIDANCE SYSTEMS
Filed Jan. 9, 1961  9 Sheets-Sheet 1

INVENTOR.
ROBERT DE LIBAN
BY
ATTYS.

Sept. 8, 1964
R. DE LIBAN
3,147,817
GUIDANCE SYSTEMS
Filed Jan. 9, 1961
9 Sheets-Sheet 2
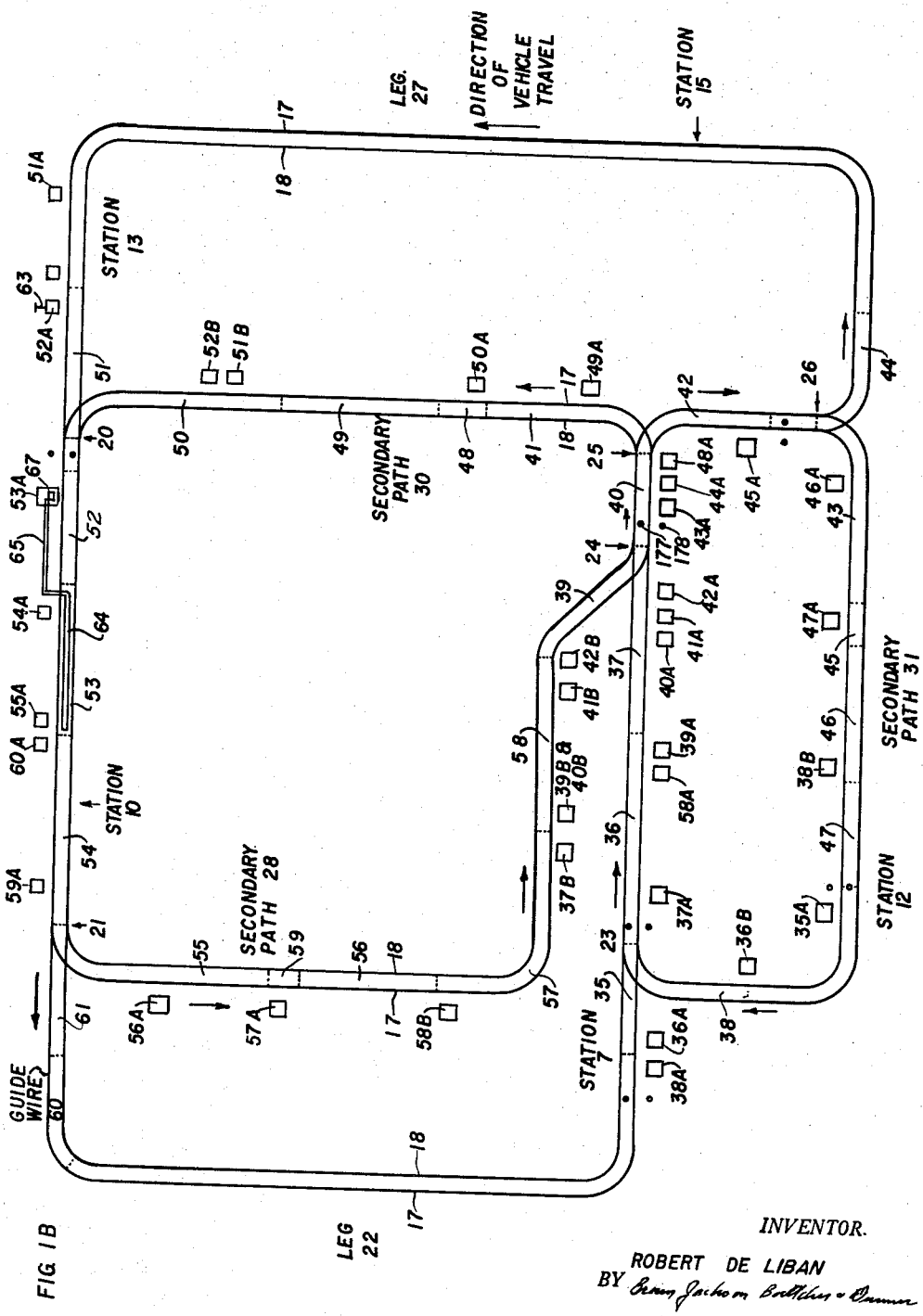
FIG IB
INVENTOR.
ROBERT DE LIBAN
BY
ATTYS.

Sept. 8, 1964
R. DE LIBAN
3,147,817
GUIDANCE SYSTEMS
Filed Jan. 9, 1961
9 Sheets-Sheet 3
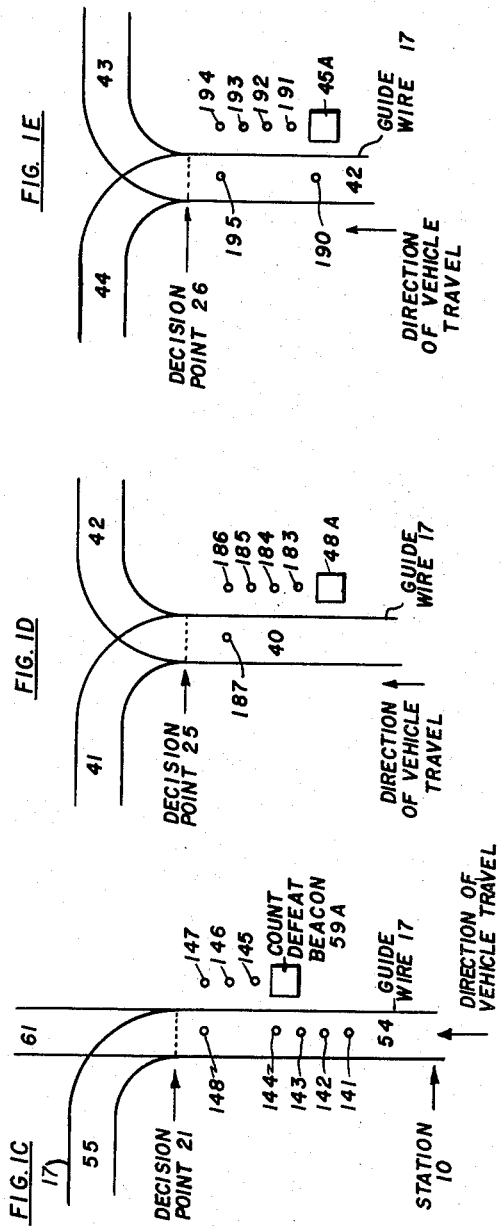
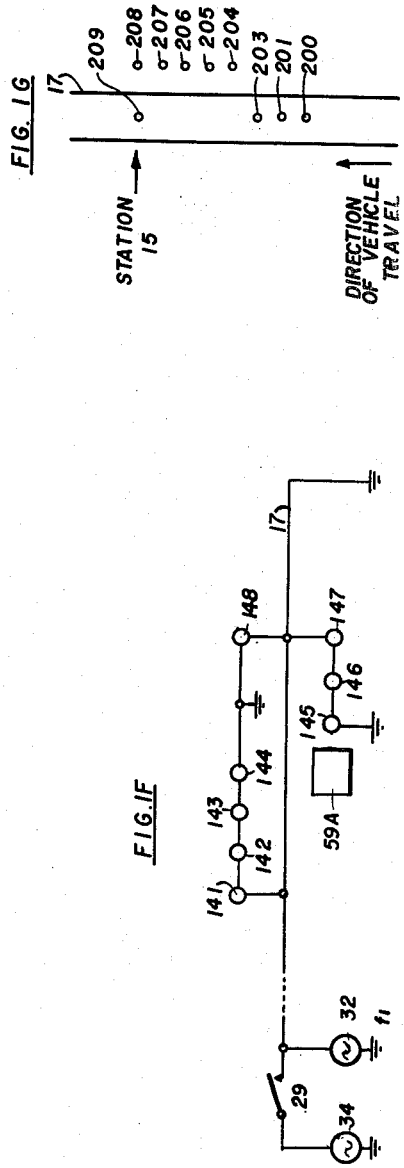
INVENTOR.
ROBERT DE LIBAN
BY
ATTYS.

Sept. 8, 1964　　　　R. DE LIBAN　　　3,147,817
GUIDANCE SYSTEMS
Filed Jan. 9, 1961　　　　　　　　　　9 Sheets-Sheet 4

INVENTOR.
ROBERT DE LIBAN
BY
ATTYS.

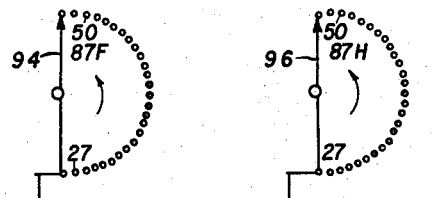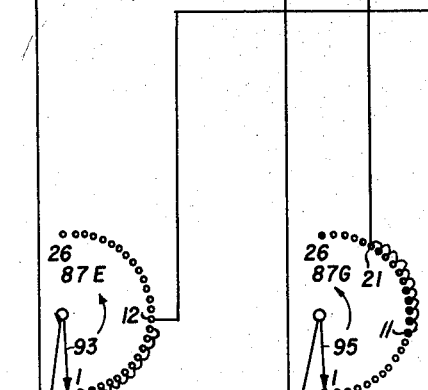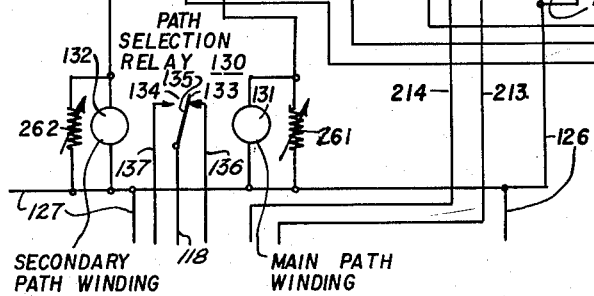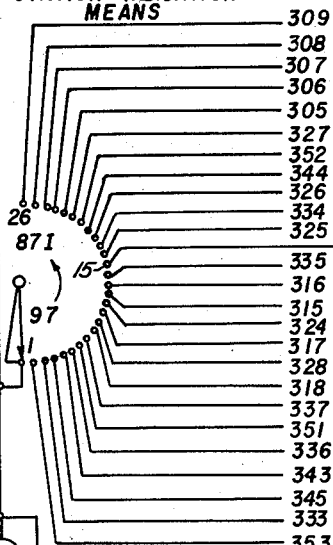

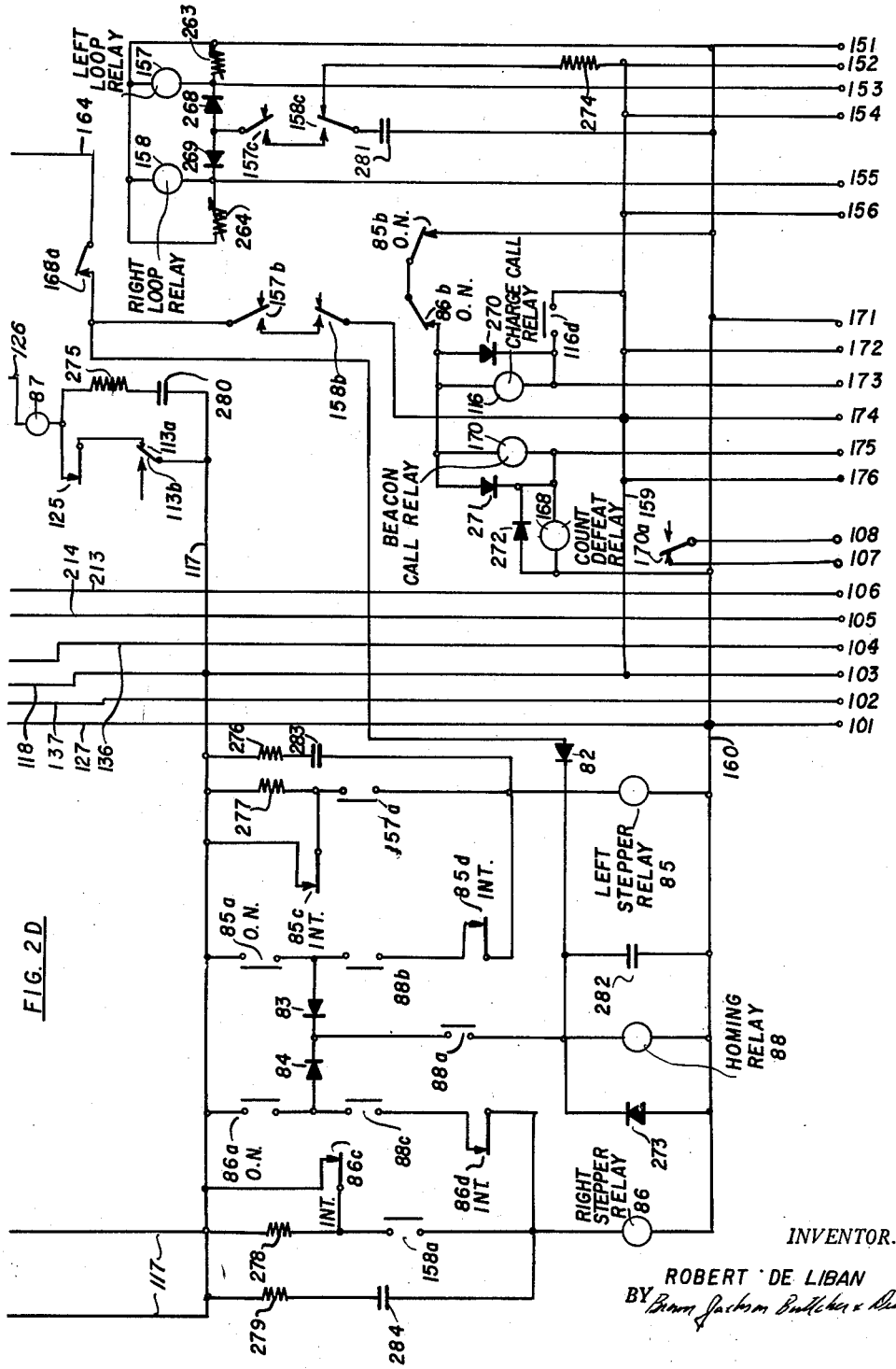

Sept. 8, 1964 R. DE LIBAN 3,147,817
GUIDANCE SYSTEMS
Filed Jan. 9, 1961 9 Sheets-Sheet 8
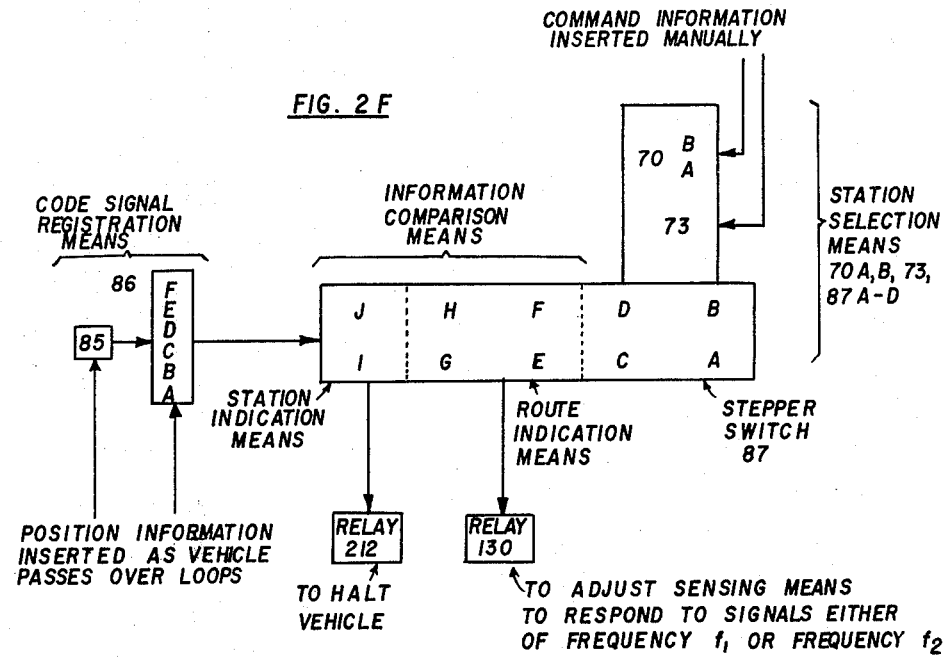
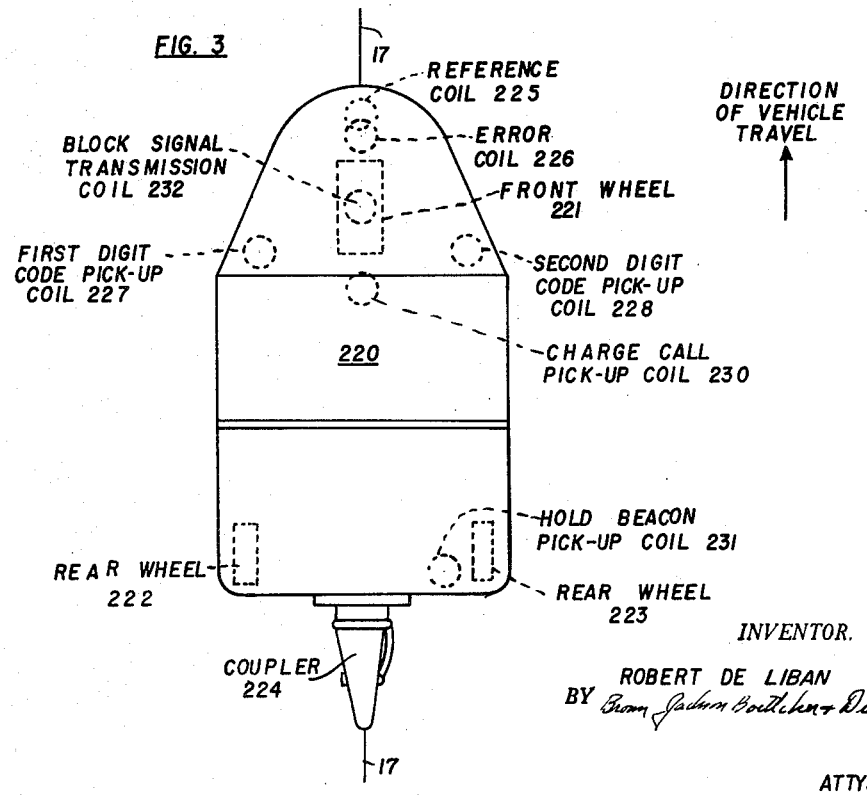
INVENTOR.
ROBERT DE LIBAN
BY
ATTYS.

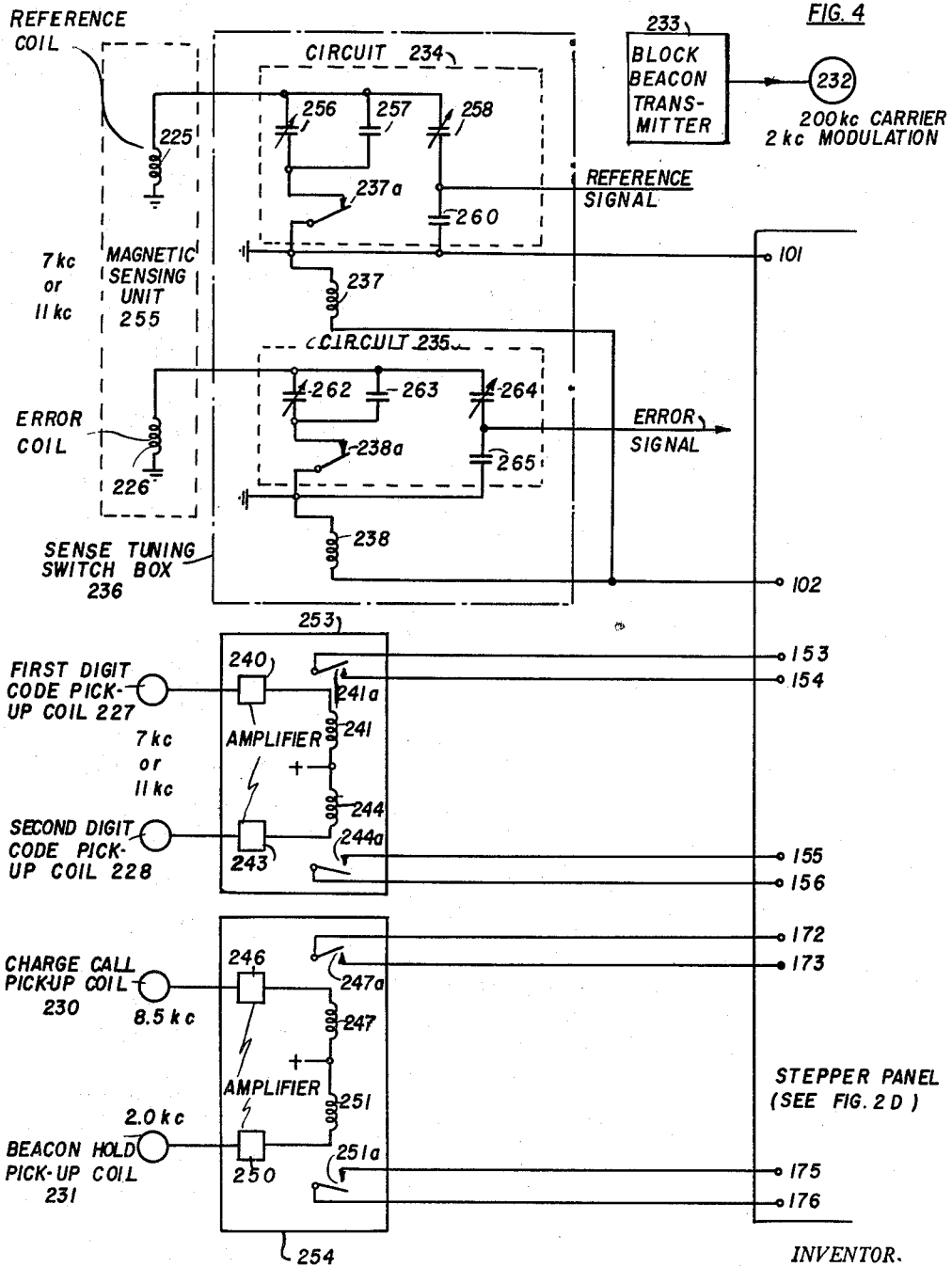

3,147,817
GUIDANCE SYSTEMS
Robert De Liban, Menlo Park, Calif., assignor to Barrett Electronics Corporation, Northbrook, Ill., a corporation of Illinois
Filed Jan. 9, 1961, Ser. No. 81,313
38 Claims. (Cl. 180—82)

This invention is directed to guidance systems and more particularly to systems in which at least one mobile vehicle is guided along a traffic path which is defined by radiated signals to arrive at a preselected location within the system layout. In pre-establishing a traffic path for such a system various types of radiated signals may be produced from different energy sources such as radioactive material, light-producing means, or means for establishing an electromagnetic field. In explaining the present invention, it will be convenient to consider a guidance system in which the traffic layout is defined by an electromagnetic field radiated from a suitably energized conductor.

The technique of utilizing a conductor to radiate electromagnetic fields for detection by a sensing means mounted on a mobile vehicle to determine the displacement of such vehicle from the desired course is now known. An early teaching of a system employing such technique is set forth in United States Patents Nos. 2,339,291 and 2,317,400, both owned by the assignee of this invention, and a later disclosure of a more accurate and eminently practical system for maintaining vehicles on a predetermined course with a high degree of accuracy and reliability is set forth in the co-pending application of Robert LeLiban, Serial No. 551,770, entitled "Guidance Systems," filed December 8, 1955 and now Patent No. 3,009,525. These references, and particularly the De-Liban application, disclose the general concept and the particular structures and circuits required for maintaining a driverless mobile vehicle such as a battery-powered truck operating along a predetermined course. The course may be established by signals radiated from a conductor such as a wire strung beneath the floor of a factory, or along a wall adjacent the desired course. The present application is directed principally to refinements of such control systems for directing the guided vehicles in a complex traffic layout.

Once the basic technique of causing a mobile vehicle such as a material-handling truck to follow a preassigned path is mastered, it is desirable to increase the efficiency of a material-handling system including a plurality of such trucks by providing a control system which causes the trucks to respond to command signals. For example, a truck may be brought to a halt at a certain location in the traffic layout and loaded with material for delivery to a particular destination. It is then desired that the truck start up, follow a preassigned path to the particular destination, and halt at such destination. It is accordingly a primary object of the present invention to provide means on such a mobile vehicle or truck for responding to a single command inserted by an operator to start the truck, to guide the truck along the traffic path to the preselected destination, and to halt the truck at the preselected destination.

Electrically-powered trucks, in which the energizing force comes from a battery carried on the vehicle, are frequently used in such material-handling systems. After a day of operation it is usually desirable to bring each truck to a preassigned battery-changing location, and to couple the truck batteries to the charging apparatus to replenish the energy source of the truck. Accordingly it is another important object of the present invention to provide means for issuing a command from a single point to which all the trucks, no matter where located, will respond and start up automatically to follow the traffic paths of the layout in travelling to the charging stations for recharging of their respective batteries.

Yet another object of the invention is to provide means in the guidance system so operative that each truck, when responding to a particular destination command, will follow the shortest available route of the alternate routes possible to complete its assignment in a minimum time with maximum efficiency.

An additional object of the invention includes the provision of location identification means at various points around the traffic layout so that the truck can determine its position as it travels along the paths of the layout, utilizing this information in determining which of the alternate routes to follow when proceeding to a preassigned location, and likewise utilizing such information at each preselected destination in the system so that the truck can recognize when it has completed an assignment.

Another feature of the invention includes the provision of beacon signalling means along the layout of the guidance system, whereby each truck senses the presence of another truck preceding it by less than a preassigned minimum distance, and is halted while such other truck remains within the minimum distance; the halted truck simultaneously signals its presence to any truck which may attempt to follow too closely behind.

A guidance system constructed in accordance with the inventive teaching comprises a mobile vehicle equipped with means for sensing radiated signals which define the traffic path, along which one or more stations are located. Station selection means provided on such truck are actuable to instruct the vehicle to proceed to a preselected station, and actuation of such means provides command information for the vehicle. Location identification means are positioned at the preselected station to provide a code signal identifying such station. Code signal registration means carried on the truck are operated responsive to receipt of the code signal by sensing means to provide position information for the vehicle. An information comparison means is provided to compare the command and position information and to issue a control signal when a particular correlation of the command and position information occurs. Such signal can operate a relay or similar means in halting the vehicle or adjusting the sensing means to follow one or another path in the traffic layout.

The features of the present invention which are believed to be novel are set forth with particularity in the appended claims. The invention itself, together with further objects and advantages thereof, may best be understood by reference to the following description taken in connection with the accompanying drawings, in the several figures of which like reference numerals identify like elements, and in which:

FIGURE 1B is a layout diagram on an enlarged scale depicting the traffic paths of FIGURE 1A in greater detail;

Figure 2A:
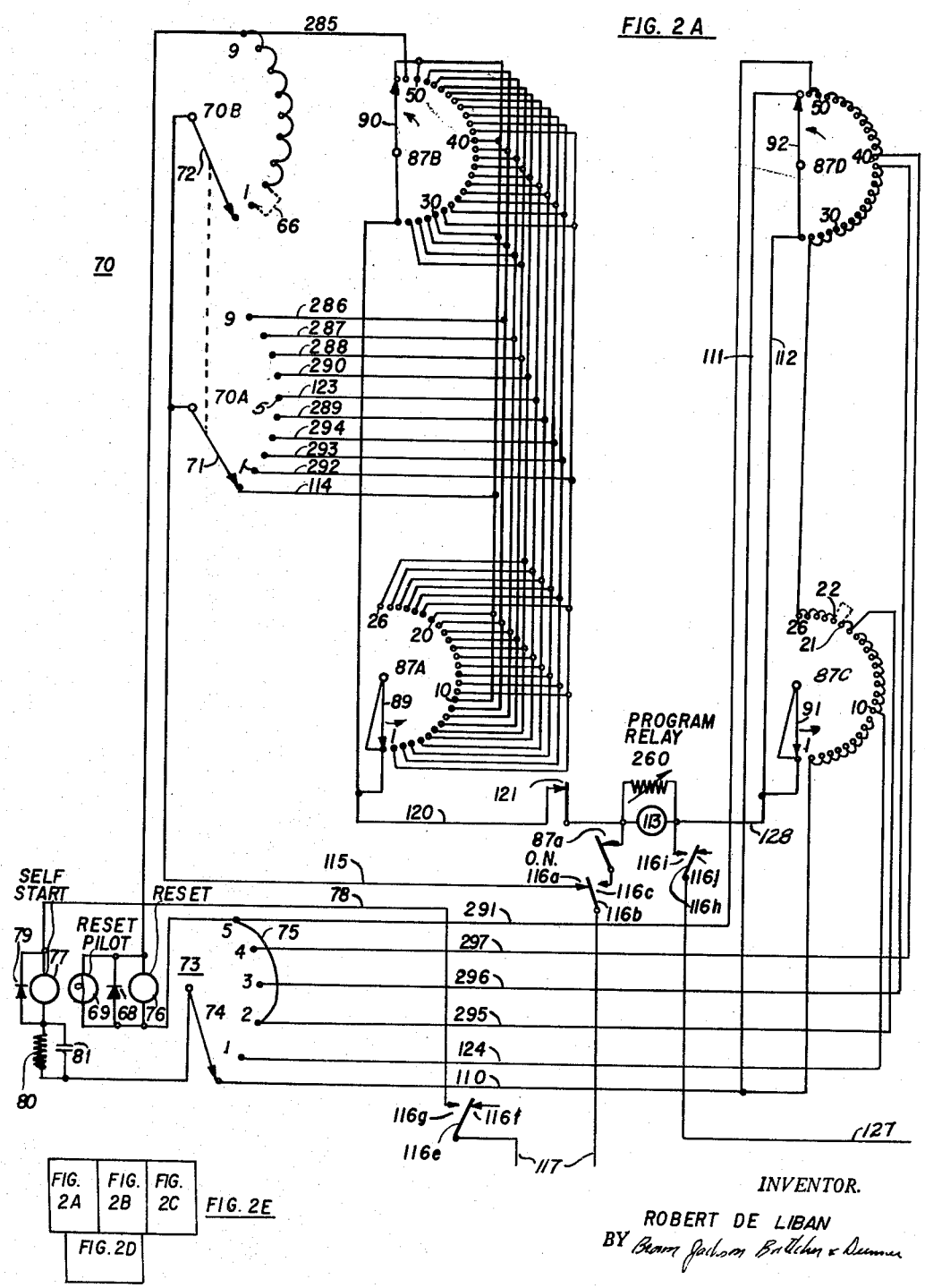

FIGURES 1C, 1D, and 1E are detail showings of the points in FIGURE 1B at which a single traffic path diverges into two paths;

FIGURE 1F is a simplified schematic showing of one method for energizing the course-defining elements shown in FIGURE 1C;

FIGURE 1G is a detail showing of a particular station or point on the traffic path;

FIGURES 2A, 2B, 2C, and 2D are partial schematic diagrams which when positioned adjacent each other as shown in FIGURE 2E, depict an operating circuit for controlling a mobile vehicle in accordance with the inventive teaching;

FIGURE 2F is a simplified block representation of certain salient components of FIGURES 2A–2D;

FIGURE 3 is a plan view of a mobile vehicle indicating the disposition thereon of various signal pick-up and transmitting means; and FIGURE 4 is a simplified schematic showing, partly in block form, of connections to the pick-up and transmitting means of FIGURE 3.

*General Layout Description*

Figure 1A:
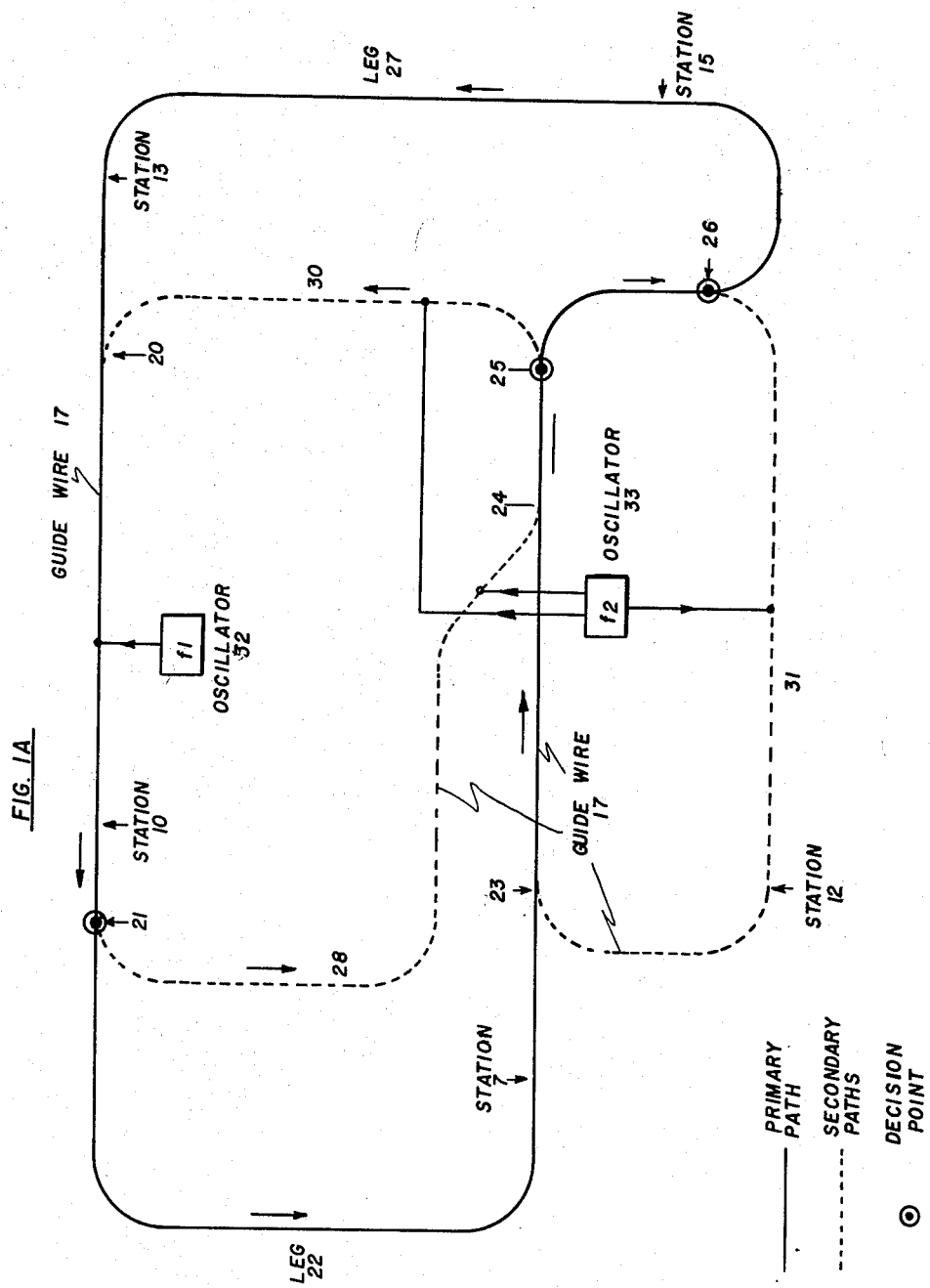
FIGURE 1A is a simplified layout diagram illustrating the traffic paths in one embodiment of the invention.

As shown in simplified fashion in FIGURE 1A, the traffic layout of the novel guidance system of the invention is generally formed by a guide wire 17 laid down in a pattern to define both the main and the secondary paths of the system. In FIGURE 1A the main traffic path is indicated by the solid line extending from junction 20 to junction 21, over outside leg 22 to junction 23, over junctions 24, 25 and 26, and outside leg 27 to junction 20. The secondary traffic paths are depicted in broken lines and are designated by reference numerals 28, 30, and 31; the secondary paths are interconnected with the main path. A number of typical stations or locations on the layout are referenced by numerals 7, 10, 12, 13 and 15. As will be made clear hereinafter, after a truck or other mobile vehicle is directed to proceed to a preselected station, such truck selects the shortest route in proceeding to the station, and therefore the points 21, 25 and 26 at each of which one of the secondary paths diverges from the main path, are denominated "decision points." That is, the inventive structure must in effect make a choice when a truck approaches any of these points in its travel to a preselected station, to determine whether to stay on the main path, or to depart and travel over the secondary path in traversing the preferred route, or shortest distance, to the station. Although only five stations are depicted in the drawings, this is a sufficient number to indicate the mode of operation of the invention in traversing the preferred route to a preselected station. As will become evident, as many as 50 stations can be provided with the disclosed structure, and more can be added in a manner made apparent in the subsequent exposition of the invention. Further the traffic pattern is readily modified to satisfy different material-handling requirements by a simple and expeditious modification of the control circuitry.

The actual energization of the guide wire to emit signals will not be described, such technique being manifest from the above-cited Paulus et al. patents and the copending DeLiban application. It is sufficient to note that an oscillator 32 is provided to supply signals of frequency $f_1$ to the main path, and oscillator 33 provides signals of a different frequency $f_2$ to each of secondary paths 28, 30, and 31. Insulating material (not shown) may be provided in an obvious manner at each decision point 21, 25 and 26, and at each return junction 20, 23, and 24, to insure that the $f_1$ and $f_2$ signals are confined to their respective paths.

The layout is set forth in greater detail in FIGURE 1B. As there shown, a plurality of blocks 35–61 (i.e. preassigned lengths of the main and secondary paths) are defined between lines 17 and 18; because the guide wire can be buried beneath the floor of the factory in which the system is installed, the guide wire will be considered as identical with line 17 for purposes of explanation of system operation. Sensing equipment is provided to determine whether a second truck is traveling through a block at less than a minimum safety distance ahead of a first truck. That is, in the illustrated embodiment a typical block is coupled to an associated control means or hold beacon spaced from such block by at least the minimum safety distance. Each truck signals its presence as it passes through such block by radiating a presence signal which is sensed by conductive means (e.g., loop 64 in block 53) and transmitted over associated circuit means (conductors 65) to the associated hold beacon (loop 67 in beacon 53A). Accordingly presence of a first truck within the limits of block 53 produces a hold signal at its associated block beacon 53A. Specifically, as the second truck enters block 52 and draws abreast of beacon 53A, receipt of the hold signal from the beacon is effective to disable the propulsion means of the second truck and thus stop the truck. A substantial safety factor is provided by positioning the beacon so that the second truck is halted nearly a full block length away from the block in which the preceding truck is then positioned. When the first truck leaves block 53 and loop 64, the hold signal at loop 67 is discontinued and the propulsion means of the second truck is again energized to propel such truck through block 52 and into block 53 adjacent hold beacon 54A, where it is halted only if the first truck has not yet cleared block 54. Only a single hold signal transmission circuit has been shown to avoid complicating the layout diagram in FIGURE 1B. The blocks are omitted from the outside legs 22 and 27 of the main path, but are shown in detail and explained in conjunction with the interior portion of the main path, as well as the secondary paths 28, 30 and 31.

In certain sections of the layout, such as a section in which two traffic paths merge into a single path (e.g., at return junction 24), it is desirable to transmit a hold signal from one block to two separate hold beacons, each of which is positioned adjacent a different traffic path. Block 37 (positioned between return junctions 23 and 24), by way of example, is coupled over a circuitry not illustrated (but similar to components 64, 65 and 67) to each of beacons 37A and 37B. Presence of a first truck within block 37 thus establishes hold signals at 37A and 37B, which signals are effective both to halt a first following truck on the main path as it passes junction 23 and draws abreast of beacon 37A, and to halt a second following truck in secondary path 28 as such truck approaches the end of block 57 and draws abreast of beacon 37B. Thus the novel block system operates to prevent collisions even in those layout sections where trucks from different paths enter a common path. The operation of this block signalling system in accordance with the inventive teaching will be set forth in greater detail hereinafter.

*General Description of Salient Components and Their Operation*

Before considering the various circuitry in detail, it is noted that the basic control circuit of the illustrated embodiment of the invention is depicted in the programming panel and in the stepper panel, the circuitry of which is illustrated in FIGURES 2A–2D. Certain of the major components of FIGURES 2A–2D have been greatly simplified and shown in block form in FIGURE 2F to accompany and illustrate this general presentation. As there shown, the programming panel includes station selection means comprising selector switches 70 and 73, which are manually actuable by an operator to instruct a truck to proceed toward and stop at a preselected station. As will be shown hereinafter, the wiper arms of switch banks 87A–87J of stepper switch 87 are stepped in unison until they reach a position indicative of the preselected station command information inserted by manual actuation of switches 70 and 73. Because of the manner of interconnection to and cooperation with those switches, a first set of banks 87A–87D of stepper switch 87 is considered part of the station selection means.

The record set of banks (87E–87J) of stepper switch 87 comprises an information comparison means which is operative to compare the command information provided by actuation of switches 70 and 73 with position information provided as the truck passes over each location identification means, which in the illustrated embodiment includes conductive loops positioned to either side of the guide wire along the traffic layout. The information comparison means is mechanically coupled to the station selection means, the wiper arms of banks 87E–87J being ganged with the wiper arms of the first set of banks 87A–87D, which in turn are stepped in response to actuation of selector switches 70 and 73. Accordingly the command information may be said to be inserted mechanically by positioning the wiper arms of switch banks 87E–87J.

A typical location includes identification means (one of which is shown in FIGURE 1C and described more fully hereinafter) which provides code signals in the vicinity thereof for reception by detection means on the vehicle as it passes over each set of loops. Such loops are positioned around the traffic layout to provide a spatial reference of the various stations or points along the layout, and also to identify the decision points or those points from which a secondary path diverges from the main path of the traffic layout.

As the vehicle passes over such location identification means, code signal registration means which in the illustrated embodiment includes a pair of stepper switches 85 and 86 are selectively actuated by signals received over sensing or pick-up means from loops disposed to the left and right, respectively, of the guide wire. The number of loops and their disposition (i.e., on which side of the guide wire they are placed) are utilized to determine a code signal unique to each particular station and decision point in the traffic layout. The stepping of switches 85 and 86 is utilized to selectively couple an operating potential to a fixed contact in the second set of switch banks 87E–87J. Accordingly, the position information may be said to be electrically applied to the information comparison means by the selective application of operating potential to a terminal in one of the above-identified switch banks.

When a truck is ordered to proceed to a preselected station and finally reaches that station, the register means or stepper switches 85 and 86 are actuated to apply operating potential to a terminal at which a wiper switch has been positioned by the station selection means. This particular correlation of the command information and the position information, represented by application of operating potential to the wiper of a switch bank for further extension to control circuitry in the system, is in effect the issuance of a control signal or the application of an operating potential to such circuitry. Operating means, for example, program stop relay 212, is coupled to the wipers of banks 87I and 87J for actuation in response to the occurrence of the particular correlation of information described above. Operation of this relay can be utilized to stop the drive means of the truck after it has reached the preselected station. Because switch banks 87I and 87J are particularly utilized in the recognition of arrival of the preselected station, these two banks are denominated "destination indication means" in the description and in the claims.

Likewise, banks 87E–87H of the information comparison means are termed "route indication means" in the description and the appended claims. That is, selective extension of operating potential over stepper switches 85 and 86 to a particular bank in the route indication means is utilized to energize one or other winding of a latching relay 130 to effect an adjustment of the sensing means of the mobile vehicle to control the truck to follow one or the other of the main and secondary paths when it passes a decision point. With this initial perspective of the system as a whole, the description will commence with the station preselection means as shown in FIGURE 2A of the drawings.

*Station Selection Means*

The circuit diagram of FIGURE 2A illustrates a portion of the station preselection means available to an operator for instructing a mobile vehicle or truck to proceed toward and stop at a preselected station, together with associated banks 87A–87D of stepper switch 87. In a preferred embodiment of the invention, the station preselection means shown in FIGURE 2A is found on the programming panel of a "Guide-O-Matic" tractor (available from the assignee of this application) modified in accordance with the inventive teaching. The station preselection means includes a units selector switch 70 having a first wiper 71 in a first bank 70A of the switch, and a second wiper 72 mechanically ganged to wiper 71 and positioned in a second bank 70B of the units selector switch. Each bank includes ten fixed contacts numbered 0–9 for selective engagement by its respective wiper. In referring to a specific contact, it will be preceded by the switch number, or by the switch bank identification when there is more than one contact bank in a switch. Thus the first contact or the zero position contact in bank 70A is identified as contact 70A–0. In like fashion the fifth contact of the same bank is denominated 70A–4. This terminology for the various selector switches including the respective banks of contacts will be followed throughout the specification.

The programming panel also includes a tens selector switch 73 which has a wiper 74 manually adjustable for selective engagement with any of six fixed contacts 0–5. The contacts will be denominated as described above; thus, the third contact in the bank is identified as contact 73–2. Wiper 74 of tens selector switch 73 is connected to ground, and a jumper 75 is shown connected between contacts 73–2 and 73–5; such a jumper has been utilized to effect switch reset in an arrangement wherein only fifteen preselected stations are provided. Jumper 75 must be removed, and jumper 66 in bank 70B must be added, when the full complement of 50 stations is included in the novel guidance system.

The circuit of FIGURE 2A also includes a reset relay 76, one end of the winding thereof being connected to contact 73–5 (and over jumper 75 to contact 73–2) of the tens selector switch and the other end of the winding being conneced to contacts 2–9 in bank 70B of the units selector switch. A diode 68 and a pilot light 69 are connected in parallel with the winding of reset relay 76.

The detached-contact presentation of relay notation is used herein. That is, the winding of each relay is depicted by a reference numeral identifying the relay and enclosed in a circle, as with the winding of reset relay 76. The contacts operated by such relay are not shown immediately adjacent the winding but instead are shown in their logical positions in the various circuits depicted throughout the drawings. Each contact is referenced by the same number as is the winding of the relay, and followed by a lower case letter to specifically identify the contact set (e.g., 76a, 76b, etc.).

Another relay 77 is also shown in FIGURE 2A, the winding of which is shunted by a diode 79; this relay is utilized in starting the vehicle responsive to receipt of a signal from a remote control point. One end of the winding is also connected over conductor 78 to a circuit which will be described hereinafter, and the other end of the winding of relay 77 is coupled over an RC network including resistor 80 and capacitor 81 to a plane of reference potential, such as ground. The energizing circuits and the functions of relays 76 and 77 will be described hereinafter.

The selector switches 70 and 73 are positioned for manual displacement by an operator to dispatch a mobile vehicle to any of a number of stations. For example, to dispatch a truck from any location to station 15 (FIGURE 1A), the operator has only to move tens selector switch 73 until wiper 74 engages contact 73–1, and displace the units selector switch until contact 70A–5 is engaged by wiper 71. The circuitry which responds to this insertion of command information or manual selection of a destination is depicted in FIGURES 2A–2D.

*Stepper Circuits*

Before considering such circuitry in detail, FIGURE 1B is referred to in the interest of orienting the reader with respect to the particular control functions to be described in greater detail hereinafter. For purposes of explanation it is assumed that a guided vehicle, such as a truck or tractor, is stopped at station 10 in block 54, in the upper portion of the main path in the traffic layout. It is further assumed that the selector switches on the tractor are then manually displaced from their normal positions to insert the command information for such truck to start up and travel over the shortest route to station 15, and to halt at station 15. The actual energization of the truck motor circuit is not shown, but completion of such circuit by a separate switch or by a switch ganged to the station selector switches 70 and 73 will be obvious to those skilled in the art. To follow such a course, the truck must "decide" at each of decision points 21, 25 and 26 whether to stay on the main path or to turn off on the secondary path in the interest of following the shortest route to station 15. Not only must the truck determine and follow the shortest route available, but it must also recognize when station 15 is reached and come to a halt at such time. The greater portion of the novel circuitry utilized in this process is shown in FIGURES 2A–2D.

Figure 2C:
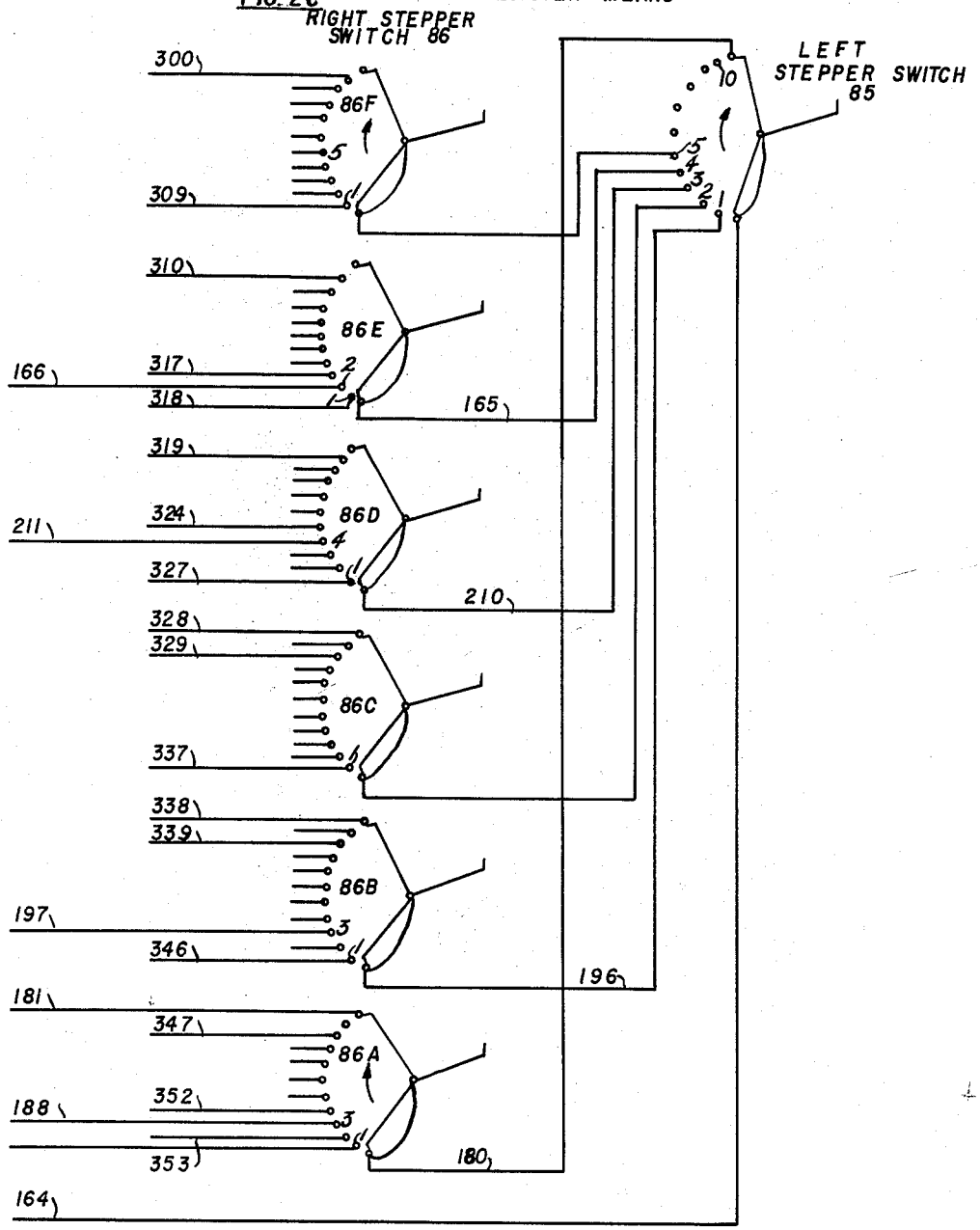

Stated broadly, FIGURE 2C includes code signal registration means shown as two stepper switches 85 and 86 which respond to electromagnetic signals radiated from loops or coils positioned adjacent the path over which the trucks run, and located on either side of the guide wire which defines the course for the truck. Stepper switch 85, the "left" stepper switch, includes only a single bank, and is actuated each time pick-up means senses a signal emitted from a coil of wire to the left side of the main guide wire. Stepper switch 86, the "right" stepper switch, includes six banks 86A–86F, and the wipers of each of these banks of switches are simultaneously stepped with each reception of a signal emitted from a loop positioned to the right of the main guide wire. "Left" and "right," as used herein, describe a location with respect to guide wire 17, looking in the direction of truck travel. The stepping of selector switches 85 and 86 is utilized to provide position information in determining the correct path to be followed at each decision point, and also for recognizing arrival of the truck at the preselected station and halting the truck when such station is reached.

In FIGURES 2A and 2B, a ten-bank selector switch 87 is depicted. The manner in which the wipers 89–98 are simultaneously stepped from contact to contact until a physical position is reached which corresponds to the command inserted or the station preselected by the station preselection means will be explained hereinafter. For the present it is noted that banks 87A–87D, inclusive, are utilized in circuitry which includes program relay 113 and is effective to cause all the wipers of stepper switch 87 to reach the desired position and to halt the stepping action at each point; hence banks 87A–87D are considered part of the station preselection means. The wipers and contacts of banks 87E–87H, inclusive, or the route indication means, are utilized in determining the shortest course for the truck to follow in arriving at a preselection station, and specifically to determine whether the main or auxiliary path is followed as the truck passes each decision point. The remaining banks 87I and 87J or the station indication means, are utilized to recognize the arrival of the truck at the preselected station, and to stop the truck when this point is reached. The associated circuitry including the various relays shown in FIGURE 2D is interconnected with stepper switch 85 and the various banks of stepper switches 86 and 87 to cooperate in the various functions outlined above. Each of these elements will be introduced into the description as it is utilized in the sequential performance of the series of events initiated by commanding the truck to travel from station 10 to station 15.

Equipment such as that on which the invention is incorporated is conventionally energized from a 24 volt battery mounted on a truck or tractor. Accordingly, in the set of terminals 101–103 shown in the lower portion of FIGURE 2D, terminal 103 is considered as connected to a positive 24 volt potential of the battery and terminal 101 is considered connected directly to the negative terminal, represented schematically as ground. The application of this energizing potential over the various circuits of FIGURES 2A–2D effects the desired operation of the various components therein.

*Sensing and Transmitting Loops on Vehicle*

Before the various circuit elements in FIGURES 2A–2D can be energized, a signal must be sensed or picked up by the vehicle as it traverses the traffic layout. The disposition of the sensing means or coils on the vehicle is indicated in the plan view of FIGURE 3, wherein an industrial truck 220 is shown following a course defined by signals radiated from guide wire 17. Such truck may include a front drive and steering wheel 221, left and right rear wheels 222 and 223, respectively, and a coupler 224 attached to the rear of the truck. The course-defining signals are detected or sensed by reference coil 225 and error coil 226, centrally mounted near the front of the truck. The physical orientation and electrical operation of such coils is described in detail in the above-identified DeLiban application.

As will be made clear hereinafter, the position information is determined by conductive loops positioned to either side of guide wire 17. The number and disposition of such loops provide a unique position-indicating code signal at each station and each decision point around the layout. Each code signal is comprised of a first digit, a second digit, and a read-out signal. The first digit information is detected by first digit code pick-up coil 227, positioned at the left side near the front of truck 220 to receive signals radiated from loops to the left of guide wire 17, and the second digit signal is detected by second digit code pick-up coil 228, disposed near the front and at the right side of the truck to receive signals transmitted from coils positioned to the right of the guide wire. The read-out command is detected as coils 227 and 228 each receive a signal at the same time.

A charge call pick-up coil 230 is positioned centrally of the truck, so as to receive signals transmitted over guide wire 17 at a frequency different than that of the steering signals to order the truck to proceed to a battery recharging station. At the right rear of the truck a hold beacon pick-up coil 231 is disposed so as to receive signals transmitted or re-radiated from a beacon signalling means (which will be described hereinafter) positioned to the side of the traffic path, which radiates a "hold" signal to halt a truck thereat whenever a congested traffic condition has been detected ahead of such truck.

At the front of the truck a block signal transmission coil 232 is positioned to radiate a presence signal from the truck for receipt by conductive loops positioned around the layout in the various blocks thereof to indicate the position of the truck. Such presence signal is received and relayed back to its respective signal beacon for re-radiating a hold signal from such beacon to halt a second truck following too closely behind the first truck. With this brief description of the coils for receiving and transmitting the various signals, the circuitry in which such signals are utilized will now be described.

*Truck Idle at Station 10*

Considering initially FIGURES 2A and 2D, and assuming that the mobile vehicle is stopped at station 10 with selector switches 70 and 73 in their zero positions, wiper 74 of tens selector switch 73 extends ground thereover and over conductors 110, 111, contact 87D–0, wiper 92, and conductor 112 to one terminal of the winding of program relay 113. Prior to actuation of units selector switch 70, engagement of wiper 71 with contact 70A–0 effectively connects conductors 114 and 115 together.

Such circuit is extended over conductor 115, contacts 116a, 116b, conductors 117 and 118 to positive battery at terminal 103. Contact set 116a and 116b is normally closed whenever its associated relay winding 116 is de-energized. As will be explained hereinafter, this relay is energized only when a single command or "charge call" is issued to direct each of the trucks to travel to a hold beacon or charging station for replenishing the battery.

Thus, at this time, positive battery is applied to conductor 114, over wiper 90, conductor 120, and interlock switch 121 of stepper relay 87 to the other side of the winding of program relay 113. Accordingly relay 113 is operated when no station command information is inserted by selector switches 70 and 73 in FIGURE 2A. Operation of relay 113 holds open its associated contact set 113a and 113b, thus interrupting an obvious energizing circuit for the winding of stepper switch 87, and preventing the movement of the wipers in the various banks 87A–87J of stepper switch 87.

The wipers of the banks of stepper switch 87 can only be displaced when the winding of relay 87 is energized, which in turn depends upon the de-energization of program relay 113. Accordingly it is necessary that an insertion of command information by actuation of manual selector switches 70 and 73 in FIGURE 2A interrupt the circuit for program relay 113 to effect the necessary displacement of the wipers of banks 87A–87J.

When the operator of the equipment displaces the tens selector switch 73 so that wiper 74 engages contact 73–1 and displaces the units selector switch 70 so that wiper 71 engages contact 70A–5, the truck is commanded to proceed to station 15. The above-described energizing circuit for program relay 113 is interrupted by such movement of the wipers, and thus contact 113b is restored to the position shown, thereby completing an energizing circuit for the winding of stepper relay 87 which extends from positive battery at terminal 103, over conductor 118, contacts 113b, 113a, interlock contacts 125 of stepper switch 87, the winding of stepper relay 87, and conductors 126, 127 to ground at terminal 101. Accordingly stepper relay 87 is energized and commences to drive the respective wipers of banks 87A–87J consecutively along their contacts.

Displacement of tens selector switch 73 has extended ground over wiper 74, contact 73–1, conductor 124, to contacts 87C–10 to 87C–19, inclusive, in bank 87C. Accordingly, as soon as wiper 91 is stepped to contact 87C–10, ground is extended from such contact over wiper 91 and conductor 128 to one side of the winding of program relay 113. Thus it only remains for positive battery to be applied to the other side of the winding of program relay 113 to effect energization thereof and consequent disablement of stepper relay 87 to halt the stepping of wipers 89–98.

With displacement of units selector switch 70 in FIGURE 2A so that wiper 71 engages contact 70A–5, positive battery is extended from terminal 103 over conductors 118, 117, contacts 116b, 116a, conductor 115, wiper 71, contact 70A–5, and conductor 123 to each of terminals 87A–5, 87A–15, 87A–25, 87B–35, and 87B–45. Accordingly, when wiper 89 in bank 87A engages terminal 87A–5, positive battery is extended over the above-described circuit to the right-hand side of the winding of relay 113. However, at this time, wiper 91 has only advanced to contact 87C–5 in bank 87C, and thus the program relay is not energized to effect de-energization of stepper relay 87. However, when wiper 89 subsequently engages contact 87A–15 to again extend positive battery to the right-hand side of the winding of program relay 113, wiper 91 of bank 87C has already engaged contact 87C–15 and extended ground over the above-described circuit to the left-hand side of the winding of relay 113. Accordingly, program relay 113 operates and at its contacts 113a and 113b interrupts the energizing circuit for stepper relay 87, thereby halting the stepping of switch 87 with wiper 89 engaging contact 87A–15, wiper 91 engaging contact 87C–15, wiper 93 engaging contact 87E–15 (no connection thereto), wiper 95 engaging contact 87G–15, and wiper 97 engaging contact 87I–15.

After the operator has inserted the command information by manual actuation of selector switches 70 and 73, he may also push a start button (not shown) to energize the truck drive system in conventional fashion and cause the motive system of the truck to commence to drive same through block 54 toward decision point 21.

As mentioned hereinbefore, the mobile unit of the invention follows a path defined by electromagnetic signals radiated from a guide wire or conductor disposed, for example, beneath the floor of the factory in which the trucks or tractors are driven. It will be apparent to those skilled in the art that the main path can be defined by signals of a first nature and the secondary paths delineated by signals of a second nature. In accordance with this aspect of the novel system, the main path around the layout is defined by signals radiated at a frequency $f_1$, and each of the three secondary paths 28, 30 and 31 is defined by electromagnetis signals radiated at a different frequency $f_2$. By adjusting the effective electrical values of the components in the sensing device or path-detection means of the truck, the device is rendered sensitive substantially only to signals of either frequency $f_1$ or $f_2$, and thus the mobile vehicle is "instructed" to follow either the main or the secondary path as it passes a decision point. Such adjustment will be explained hereinafter in connection with FIGURE 4. It is apparent that both the main path and the secondary path can be defined by signals of frequency $f_1$, with only a short length of conductor energized at frequency $f_2$ adjacent each divergence between the main path and the secondary path for use in controlling the switching of the vehicle from the main path to the secondary path, after which the sensing means is again tuned to signals of frequency $f_1$ and the truck continues to travel along the secondary path. Thus a control operation, such as the actuation of a relay, can provide the "decision" of the truck as it approaches each of the three decision points in the layout. In the assumed operation in which the truck travels from station 10 to station 15, the truck in its movement first approaches decision point 21, and its operation thereat will now be considered.

The main component of the novel circuit shown in FIGURES 2A–2D which determines which of the two paths is to be followed is a latching relay 130 (FIGURE 2B) which also includes a pair of windings 131 and 132. The relay further comprises fixed contacts 133 and 134 in addition to a movable contact or armature 135. Whenever "main path" winding 131 is energized to indicate that the truck should follow signals of frequency $f_1$ or the main path of the layout, even though such energization is only momentary, armature 135 is displaced to engage fixed contact 133 and remains in engagement therewith after the energization is removed from winding 131. Armature 135 is displaced to engage contact 134 responsive to a subsequent energization of "secondary path" winding 132 of the latching relay. In the position shown, engagement of armature 135 with fixed contact 133 is effective to apply positive battery from terminal 103 over conductor 118, armature 135 and contact 133, and conductor 136 to terminal 104. This application of an energizing or operating potential can be utilized in an obvious manner to effect operation of a relay and adjust the value of components in the sensing means of the truck to determine which of the two signal frequencies will be followed along the layout. Likewise, energization of "secondary path" winding 132 is effective to displace armature 135 to engage fixed contact 134, and thus apply positive battery from terminal 103 over conductor 118, armature 135 and contact 134, and conductor 137 to terminal 102. A relay can likewise be coupled to terminal 102 to effect an analogous operation and thereby alter the parameters in the path-detection means of the truck.

In the assumed example, as the truck approaches any of the decision points (21, 25 and 26), it is traveling along the main path and must "decide" whether to continue along the main path or to commence following the secondary path. Accordingly, prior to reaching any decision point, winding 131 will have been energized as a result of a previous command to position armature 135 as shown in the drawing and will apply operating potential from terminal 103 to terminal 104. If the novel circuitry of the inventive arrangement "decides" that the main path should be followed to provide the shortest route to the preselected destination, then no change is made in the position of latching relay 130 and the truck continues past the decision point on the main path. In the alternative, should the truck decide that it is expedient to follow the secondary path in the traversal of the shorter distance to the preselected station, then secondary path winding 132 is energized, thereby displacing armature 135 to engage fixed contact 134 and applying operating potential to terminal 102 to effect the change in the parameters of the sensing means as described above. The circuitry for arriving at the decision and carrying out the decision when made will now be described.

Referring to FIGURE 1C, the components at decision point 21 are shown in more detail. As the truck approaches the decision point 21 it is following a course defined by signals of frequency $f_1$ radiated from guide wire 17. Four consecutive conductive loops of wire 141–144 (which may be formed from the guide wire by displacing same laterally of the traffic path, or from other suitable material) are shown disposed to the left of guide wire 17, and a count defeat beacon 59A and three successive loops 145–147 are shown to the right of guide wire 17. An additional loop or coil 148 is disposed to the left of guide wire 17 in a position opposite that of coil 147. As will be made clear from the subsequent description, position signals radiated from these loops, which together comprise one location identification means, may be at the same frequency as those signals emitted from guide wire 17. The position signals are received by pick-up coils 227 and 228 on the truck and utilized to actuate code signal registration means (switches 85 and 86, FIGURE 2C) to provide position information for comparison with the already-inserted command information. It is both the number and the placement of the loops (whether to the right or left of guide wire 17) which provide the desired position information.

Such position information is represented by loops 141–146, a read-out signal being provided by loops 147 and 148. Loops 141–144 are positioned to the left of the guide wire to signal "4 left" as the first digit of the position code signal; loops 145 and 146 provide a "2 right" signal. Thus the "4 left, 2 right" position-indicating code signal in effect "tells" the truck exactly where it is on the layout. By comparing the position signal characteristic of the location of decision point 21 against the previously-inserted command information instructing the truck to proceed to station 15, the information comparison means determines which is the shorter route between decision point 21 and the preselected station. When the shorter route to station 15 lies over the main path past decision point 21, then the steering signal is evidenced by no transmission of a control signal to the latching relay, thus leaving armature 135 in its initial position and causing the truck to containue past decision point 21 and remain on the main path. Alternatively, when the shorter route lies over secondary path 28, then the steering signal is evidenced by a control signal transmitted to the circuitry of FIGURE 2B to momentarily energize winding 132 of the latching relay, thus adjusting the frequency response of the components in the path-detection means of the truck to respond substantially only to signals of frequency $f_2$ and thereby cause the truck to depart from the main path and enter secondary path 28 as it passes decision point 21. The manner in which the unique code signal is received as the truck approaches decision point 21 will now be described.

FIGURE 1F is a simplified schematic showing of one way in which the loops can be energized. As there shown signal generator 32 is connected to supply an alternating voltage at a frequency $f_1$ to guide wire 17 to provide a path-determining signal. Another signal generator 34 is connected so that, responsive to closure of switch 29, a "charge call" signal at a frequency different than frequency $f_1$ is transmitted over the same guide wire; the use of such a signal in effecting vehicle battery re-charging will be described hereinafter. The loops 141–148 are connected to be energized over guide wire 17 as shown. It has been found that when separate sensing devices or pick-up coils are utilized to receive the position signals from the loops to the left and right of the guide wire, a common energizing means at the same frequency may be utilized as indicated in FIGURE 1F.

Those skilled in the art will recognize that any of a plurality of different sensing and amplifying arrangements can be utilized to detect and amplify the signals radiated from loops 141–148. For this explanation it is sufficient to note that a signal radiated from a "left" loop, for example such as loop 141 in FIGURE 1C, is detected by pick-up coil 227, amplified and utilized to effect a conventional relay operation which in turn effects a contact closure that connects together terminals 153 and 154 in the lower left-hand portion of FIGURE 2D. Accordingly the winding of left loop relay 157 is energized over a circuit extending from positive battery at terminal 103, over conductor 159, terminals 154 and 153, the winding of left relay 157, and conductors 161 and 160 to ground at terminal 101. Relay 157 operates and at its contacts 157a (right side of FIGURE 2D) completes an energizing circuit for the winding of "left" stepper relay or switch 85. Relay 85 operates over a circuit extending from positive battery at terminal 103, conductors 118, 117, interlock switch 85c of left stepper switch 85, contacts 157a, the winding of stepper relay 85, to ground at terminal 101. Such operation steps the wipers of switch 85 so that the wiper shown contacting terminal 85-0 (FIGURE 2C) is displaced to engage terminal 85-1. Identical operations are effected as the coil 227 passes over loops 142, 143 and 144 in turn, stepping such wiper to engage terminal 85-4 and thus registering the "4 left" portion of the code signal which identifies decision point 21.

An analogous operation occurs as the right-hand sensing element passes over each of the right-hand loops 145–147. Initially coil 228 senses the signal radiated from loop 145, and this signal is utilized to effect a relay operation which in effect connects together terminals 155 and 156 to complete an energizing circuit for right loop relay 158. Accordingly the right loop relay is energized over a circuit extending from positive battery at terminal 103, over conductor 159, terminals 156 and 155, the winding of relay 158, and conductors 161 and 160 to ground at terminal 101. Relay 158 operates and at its contacts 158a (right side of FIGURE 2D) completes an energizing circuit for right stepper relay 86 over a circuit extending from positive battery at terminal 103, conductors 118, 117, interlock contacts 86c, contacts 158a, the winding of right stepper switch 86, and conductor 160 to ground at terminal 101. Thus stepper switch 86 is pulsed and steps the wiper of each bank 86A–86F from the 0 terminal to the #1 terminal in each bank. After coil 228 has passed over loop 146, the "2 right" portion of the code signal characteristic of decision point 21 has been registered, the wiper of each of banks 86A–86F engaging the #2 terminal in the bank.

Thus, as the truck approaches loops 147 and 148 at decision point 21, left stepper switch 85 has been pulsed four times and right stepper switch 86 has been pulsed twice to register the "4 left, 2 right" code signal.

As will be made clear hereinafter, the read-out command provided by simultaneous operation of left and right relays 157 and 158 (effected by the simultaneous receipt of signals from loops 147 and 148 as coils 228 and 227 pass thereover) does not affect the position information already registered as signals were received from loops 141–146. Thus the position signal "4 left, 2 right" has been inserted in the code signal registration means including stepper switches 85 and 86 by positioning the wipers of these switches; this code signal or position information will be compared to the command information inserted by the previously-described stepping of the wipers of switch 87.

At this juncture of the operating sequence, the "4 left, 2 right" position-indicating code signal has been received, and part of an energizing circuit has been prepared from conductor 164 (FIGURE 2C) over one wiper of switch 85, contact 85-4, conductor 165, a wiper of bank 86E, contact 86E-2, conductor 166, contact 87G-15, wiper 95, and diode 167 to the upper terminal of "secondary path" winding 132 of relay 130, the other side of this winding being connected over conductor 127 to ground. Banks 87E–87H of stepper switch 87 are so connected that, after a station has been preselected by appropriately positioning wipers 93–96 of those banks, the route comparison and selection is made by selective application (or non-application) of operating potential over a circuit such as that just described to "secondary path" winding 132 of latching relay 130. If it is determined that the shorter route to station 15 lies over the main path, then no operating potential will be applied to any of the terminals in banks 87E–87H, leaving relay winding 132 unoperated, and consequently leaving the frequency response of the path-detection means adjusted to detect substantially only signals of frequency $f_1$; accordingly, the truck will continue past decision point 21 on the main path. Alternatively, if it is determined that the shorter route to station 15 includes secondary path 28, then operating potential will be applied over the above-described circuit including wiper 95 in bank 87G to energize winding 132 of the latching relay. Thus, the selective connections between the various terminals of banks 86A–86F of right stepper switch 86 and the terminals of banks 87E–87H in the information comparison means constitutes a selective pre-marking of the information comparison means which is then able, having already received the command information identifying the preselected station, to compare the instantaneous position of the truck as signalled by the register means including switches 85 and 86 and determine instantly the shorter route to the preselected station. As the truck traverses the traffic layout, such pre-marking effects an immediate route determination at each decision point, either commanding the truck to stay on the main path or to enter the secondary path, according to which coincides with the shortest route to station 15.

In the present example, after the insertion of the "4 left, 2 right" information on the code signal registration means, with wiper 95 in the "station 15" position, the equipment is awaiting the application of operating potential over conductor 164 to energize winding 132 and instruct the truck to follow secondary path 28 in its travel toward station 15. As shown on the layout, this is a considerably shorter distance than the longer traversal over outside leg 22 to return junction 24.

At this time coils 227 and 228 detect the signals radiated from read-out loops 147 and 148 at decision point 21 (FIGURE 1C), so that left loop relay 157 and right loop relay 158 are operated simultaneously. Accordingly contacts 157b and 158b are closed simultaneously to complete the remainder of the above-described energizing circuit for winding 132, extending positive battery from terminal 103 over conductor 159, contacts 158b, 157b, 168a (of count defeat relay 168 to be described hereinafter), conductor 164 and the remainder of the previously-described energizing circuit. Thus winding 132 is energized and pulls armature 135 from contact 133 to engage fixed contact 134, thereby extending positive battery from terminal 103 over terminal 102 as described hereinbefore to adjust the path-detection means to respond to signals of frequency $f_2$ and cause the truck to leave the main path and turn left into block 55, to follow secondary path 28 toward return junction 24.

It is noted that as contacts 157b and 158b are closed simultaneously to provide a read-out signal when the truck passes over read-out loops 147 and 148, winding 132 is energized at the same time that operating circuits are completed for left and right stepper relays 85 and 86. However, stepper switches 85 and 86 are of the type in which the wipers are advanced one step upon de-energization of its relay winding. Accordingly, the read-out command and consequent energization of secondary path winding 132 occurs before the wipers of left stepper switch 85 and right stepper switch 86 can be advanced to change the code signal or position information inserted by the signals received from position-indicating loops 141–146.

*Count Defeat Operation*

It is noted that, had not $f_2$ winding 132 been energized over the above-described circuit as the truck passed over read-out loops 147 and 148 at decision point 21, armature 135 would have remained in the position indicated in the drawing and the path-detection means of the truck would have remained tuned to frequency $f_1$, causing the truck to pass from block 54 into block 61 as it started around outside leg 22 of the main path (FIGURES 1A and 1B). One way in which such operation could have been effected, notwithstanding the command for the truck to proceed to station 15 over the shortest route, is by energization of "count defeat" beacon 59A positioned adjacent decision point 21 (FIGURES 1B and 1C) to override the "operate winding 132" instruction. This count defeat beacon is caused to radiate a "hold" signal responsive to the presence of a second truck in block 59 of secondary path 28, which presence is detected by a conductive loop (not shown, but similar to loop 64 in block 53) positioned to pick up only signals radiated from a truck so located. Because block 59 is made much shorter than the other blocks, a truck passes rapidly through this short block, and it is thus unlikely that a moving truck will traverse block 59 at the exact instant required to provide a count-defeat signal at beacon 59A to countermand the "follow secondary path" instruction and cause the first truck passing decision point 21 to pass from block 54 into block 61 on the main path. However, if a third truck is then located in block 57 (whether moving or halted by a signal from either beacon 58B or 37B), the second truck in block 59 is halted by a hold signal re-radiated from beacon 57A, and the first truck is instructed by re-radiation of a signal at count defeat beacon 59A to follow outside leg 22 rather than encounter the congested traffic condition in secondary path 28.

If in fact a second truck is present in block 59, a signal is picked up by the loop in such block and relayed to beacon 59A, whereat it is re-radiated and sensed by pick-up coil 231 (FIGURE 3). The signal as sensed is effective to provide a control action (explained more fully hereinafter) which, in effect, connects together terminals 175 and 176 in FIGURE 2D. Thus count defeat relay 168 is energized over an operating circuit extending from positive battery at terminal 103 over conductor 159, terminals 176, 175, the winding of count defeat relay 168, and conductor 160 to ground at terminal 101. Relay 168 operates and opens contacts 168a (FIGURE 2B), thereby interrupting the above-described operating circuit for $f_2$ winding 132 before the truck reaches read-out loops 147 and 148 to effect the closure of contacts 157b and 158b and the application of operating potential over contacts 168a. Accordingly, because of the congested traffic conditions in secondary path 28, the frequency response of the path-detection means is left unchanged and the truck is sent on past decision point 21 around outside leg 22 of the main path, notwithstanding that the shortest route to station 15 lies over the secondary path.

*Return of Stepper Switches to Their Normal or Zero Positions*

From the foregoing explanation it is evident that, because the truck requires position information to determine the shortest route as it encounters a decision point (and, as will be shown, requires similar information to recognize a preselected station), the wipers of switches 85 and 86 are stepped or moved in increments as the truck passes over the various loops embedded to the left and right of guide wire 17 indicating the first and second digits of the position code. After it has utilized this information, for example, after it has departed from the main path to follow the secondary path at decision point 21, it is desirable to return the stepper switches to their normal positions prior to encountering the next position loops in the layout. Toward this end a homing relay 88 is included in the control circuit of FIGURES 2A–2D, the winding of which is depicted between the windings of left and right stepper relays 85 and 86. Homing relay 88 is energized whenever the truck passes over a pair of read-out loops, such as read-out loops 147 and 148 in FIGURE 1C, to effect the concomitant actuation of left and right loop relays 157 and 158 in the stepper panel. As the read-out command is received, a control action is effected as described hereinbefore and contacts 157b and 158b are simultaneously closed, completing an energizing circuit which extends from positive battery over conductor 159, contacts 158b, 157b, diode 82, and the winding of relay 88 to ground at terminal 101. When the truck has traversed the path over position-indicating loops 141–146, stepper switch 85 is in the #4 position, and stepper switch 86 is in the #2 position. Thus both the left and right stepper switches are off their normal or 0 position, and off-normal contacts 85a and 86a are closed. Relay 88 operates and at its contacts 88a completes a holding circuit extending from positive battery at conductor 117 over contacts 85a, diode 83, contacts 88a, and the winding of relay 88 to ground at terminal 101; contacts 86a and diode 84 provide a shunt circuit for contacts 85a and diode 83. At certain points along the traffic layout one of the two position-indicating digits is a zero; e.g., as the truck approaches decision point 25 (as shown in FIGURE 1D) to register "0 left, 3 right," off-normal contact 85a remains open but the holding circuit is nevertheless completed over contacts 86a and diode 84. Relay 88 is operative over circuitry including contacts 88b and 88c to drive the wipers of switches 85 and 86 until each returns to its normal or 0 position. When both switches are again in their normal position, contacts 85a and 86a are opened, and the holding circuit for homing relay 88 is interrupted to de-energize same. Thus switches 85 and 86 are now ready to receive the next position-indicating code signal.

*Beacon Hold Operation*

Referring to the description of "Count Defeat Operation" given above and to FIGURE 2D, it is noted that "beacon hold" relay 170 also receives the application of energizing potential from terminal 175 to one end of its winding at the same time such voltage is applied to the winding of relay 168 to countermand an "enter secondary path" command at any of decision points 21, 25 and 26. However, the other end of the winding of relay 170 is not connected to ground at such time because each of off-normal contact sets 85b and 86b is open at the time the truck passes count defeat beacon 59A. When the wipers of switches 85 and 86 are returned to the normal or 0 position, contact sets 85b and 86b are again closed. Thus, with the energizing circuit for beacon hold relay 170 interrupted at contact sets 85b and 86b, beacon hold relay 170 remains de-energized when count defeat relay 168 is operated to cause a truck to circumvent a secondary path.

In considering the operation of a beacon in providing a signal for halting a first truck adjacent thereto because a second vehicle is preceding the first truck by less than the minimum safety distance, it is assumed that such first vehicle is traversing the end portion of block 51 (FIGURE 1B) past return junction 20 and is about to enter block 52, thus to draw abreast of hold beacon 53A. It is further assumed that a second truck is then traversing block 53, and transmitting a presence signal from its respective block signal transmission coil 232 (FIGURE 3) over conductive loop 64 (FIGURE 1B) and conductors 65, to be re-radiated from loop 67 in hold beacon 53A. As will be made clear hereinafter, reception of such re-radiated hold signal over hold beacon pick-up coil 231 on the first vehicle is effective to provide a control operation which, in effect, connects together terminals 175 and 176 in the lower portion of FIGURE 2D. It is further noted that, because there are no position-indicating conductive loops to either side of the guide wire adjacent beacon 53A, as the first vehicle draws abreast of hold beacon 53A each of stepper switches 85 and 86 is in its normal or zero position, thus maintaining contact sets 85b and 86b in the closed position as shown in FIGURE 2D.

As the first truck draws abreast of hold beacon 53A and contacts 175 and 176 are effectively connected together to apply operating potential to one end of the winding of relay 170 (FIGURE 2D), ground is applied to the other side of the winding from terminal 101 over conductor 160 and contact sets 85b and 86b. Beacon hold relay 170 operates and at its contacts 170a interrupts the energizing circuit for the truck's drive motor to halt the truck until the path is clear ahead. Operation of relay 168 simultaneously with relay 170 has no effect, because there is no steering signal to be countermanded by opening contacts 168a. Of the various beacons shown in FIGURE 1B, 59A, 48A, and 45A are count defeat beacons, and the remainder are hold beacons.

Although the illustrated system describes conductor 65 intercoupling conductive loop 64 and loop 67, it is apparent that additional units such as an amplifier, frequency changing system, or signal detector and relay unit might be utilized between the pick-up and re-radiating loops. In the latter system, the signal received from the lead vehicle can be utilized to operate a relay and switch in a transmitting loop energized from the guide wire itself, to provide the energy for signalling the following truck to halt. Alternatively, such a relay unit might complete a transmitting loop system responsive to receipt of a signal from the following vehicle, and re-radiate such signal to the same following vehicle to cause it to halt at a safe distance behind the preceding truck.

Turning now to the progression of the truck along secondary path 28, it is assumed that the above-described hypothetical traffic conditions do not exist in the secondary path and that the frequency response of the path-detection means of the truck was in fact altered to respond substantially only to signals of the second frequency along secondary path 28 as the truck travels toward return junction 24. The truck travel is straightforward, unless of course it is halted at any hold beacon because a second truck is located in some other block farther along the path. It is noted that as the first truck reaches the end of block 57, it can be halted by a signal from hold beacon 37B indicating the presence of a second truck in block 37 in the main path just prior to return junction 24; the second truck is closer to the return junction and therefore priority is given to such truck. As the first truck proceeds from block 57 to block 58, it will be halted at the beginning of block 58 if there is a second truck either in block 39 in the secondary path just prior to return junction 24 or in block 40 in the main path just beyond junction 24. As the first truck proceeds to the end of block 58, it will be halted by signals from either of hold beacons 41B or 42B if a preceding second truck has turned from block 40 into either of blocks 41 and 42. There is no beacon to halt the truck in block 39, and once it has passed hold beacon 42B the truck proceeds past return junction 24 into block 40 of the main path.

After each return junction (20, 23 and 24), it is desirable to position a pair of simultaneous or read-out loops along the guide wire in the main path. Such placement is effective to cause simultaneous operation of left and right loop relays 157 and 158 to energize $f_1$ winding 131 and readjust the frequency response of the path-detection means to a condition in which substantially only signals of frequency $f_1$, defining the main path, are picked up from the guide wire.

After the truck passes junction 24, simultaneous loops 177 and 178 are encountered almost immediately. Signals from these loops are picked up in the manner described hereinbefore to effect simultaneous energization of relays 157 and 158, thereby effecting the closure of contacts 157b and 158b (FIGURE 2D). Accordingly an energizing circuit for $f_1$ winding 131 is completed from positive battery at terminal 103 over conductor 159, contacts 158b, 157b, 168a, conductor 164, wipers of left stepper switch 85, conductor 180, wipers of bank 86A of the right stepper switch, conductor 181, diode 182, $f_1$ winding 131, conductor 126, and over conductor 127 to ground at terminal 101. Winding 131 is thus energized and displaces armature 135 to engage fixed contact 133, thereby effecting a control action which again places the path-detection means unit of the truck in a condition to sense only signals of frequency $f_1$ along the main path of the guidance system.

As the truck approaches decision point 25, shown in detail in FIGURE 1D, it again must "decide" whether the most expedient route to station 15 is over the main path into block 42 or over secondary path 30 into block 41. Accordingly the conductive position-indicating and read-out loops 183–187 are positioned on either side of guide wire 17 and energized in exactly the same fashion as loops 141–148 in FIGURES 1C and 1F. From the foregoing explanation it is evident that read-out loops 186 and 187 are utilized only to effect concomitant closure of contacts 157b and 158b in the application of operating potential over conductor 164 as described hereinbefore. Accordingly the code signal sensed by pick-up coils 227 and 228 of the truck in its approach to decision point 25 is "0 left, 3 right." That is, there are no signal loops to the left of guide wire 17 prior to read-out loops 186 and 187, and three loops (183–185) are positioned to the right of the guide wire. From the foregoing explanation of the operation of left and right stepper switches 85 and 86, it is apparent that the wipers of left stepper relay 85 are not displaced at all by this position-indicating code signal and the wipers of banks 86A–86F of right stepper switch 86 are stepped to the #3 terminal in the respective banks. Accordingly, after the position signal "0 left, 3 right" is inserted, the encountering of read-out loops 186 and 187 effects the concomitant operation of loop relays 157 and 158 to close contacts 157b and 158b. At this time an energizing circuit is completed from positive battery at terminal 103 over conductor 159, contacts 158b, 157b, 168a, conductor 164, wipers of stepper switch 85, conductor 180, wiper of bank 86a, contact 86A–3, and conductor 188 to contacts 87E–1 to 87E–11, inclusive, in bank 87E of stepper switch 87. However, when the command information was inserted to instruct the truck to proceed to station 15, wiper 93 of this bank was stepped to engage blank contact 87E–15. Accordingly, the positive potential applied from terminal 103 to terminals 1–11 of bank 87E is extended no farther. Thus there is no steering signal issued, and no change in the condition of armature 135 of latching relay 130 which determines which signal frequency is sensed and thus which path is followed. Because the path-detection means of the truck was already adjusted (as the truck passed loops 177 and 178) to sense only signals of frequency $f_1$, the truck continues on the main path as it passes decision point 25 to enter block 42 and proceeds toward decision point 26.

It is noted that, if a truck had been present in block 48 and a presence signal was re-radiated from count defeat beacon 48A, the same action of the truck in turning to the right would have occurred. However, if the truck had been instructed to proceed to any of stations 1–11, the circuitry would have instructed the truck to turn left and follow the secondary path at decision point 25 by energizing $f_2$ winding 132 in a manner that will be apparent from the foregoing explanation. Had the truck been instructed to turn left, this instruction would have been countermanded or defeated by a signal transmitted from a second truck in block 48 and re-radiated by count defeat beacon 48A in the same manner as described hereinbefore in connection with count defeat beacon 59A at decision point 21.

As the truck approaches decision point 26, shown in FIGURE 1E, it can be prevented from turning right into secondary path 31 by a signal transmitted from a second truck in block 45 and re-radiated from count defeat beacon 45A, as described in connection with count defeat beacons 48A and 59A. However, absent a signal from count defeat beacon 45A, the truck traverses position-indicating loops 190–193, which are effective to insert the position signal "1 left, 3 right," thus stepping a wiper of left stepper switch 85 to engage contact 85–1, and also stepping the wipers in each bank of stepper switch 86 so that the #3 contact in each bank is engaged by a wiper. Accordingly, as the truck reaches read-out loops 194 and 195, relays 157 and 158 are operated simultaneously as described hereinbefore to complete an operating circuit extending from positive battery at terminal 103 over conductor 159, contacts 158b, 157b, 168a, conductor 164, a wiper of left stepper switch 85, contact 85–1, conductor 196, a wiper of bank 86B, contact 86B–3, conductor 197 to contact #12 in bank 87E of stepper switch 87. However, as noted hereinbefore, wiper 93 is at this time resting on contact 87E–15, and the energizing circuit is extended no farther than contact 87E–12. Thus no steering signal is provided, and armature 135 of the latch-unlatch relay arrangement is maintained in the position shown in the drawings. Accordingly the path-detection means remains tuned to signals of frequency $f_1$, and the truck is effectively directed to follow the main path at decision point 26 and proceed into block 44 in its approach to preselected station 15. The circuitry of the stepper arrangement shown in FIGURES 2A–2D is such that the truck would only have been ordered to turn right and enter block 43 if it had been proceeding toward station 12; in its progress toward any of the other stations in the layout, it would be directed to turn left at decision point 26.

*Halting at Preselected Station*

Having selected the shortest course as it approached and passed each of decision points 21, 25 and 26 in the layout, it only remains for the truck to recognize station 15 and to halt its forward motion as it arrives at such station. As previously noted banks 87I and 87J of stepper switch 87, the destination indication means, are utilized in halting the truck at the preselected station. As shown in FIGURE 1G, a number of loops 200–209 are disposed to the left and right of the guide wire at station 15, to provide a position-indicating code signal as explained above in connection with decision points 21, 25 and 26. It is evident from the drawing that the position signal "3 left, 4 right" has been registered as the truck approaches read-out loops 208 and 209. After such position signal is inserted and responsive to encountering readout loops 208 and 209, an energizing circuit is completed to extend operating potential from terminal 103 over conductor 159, contacts 158b, 157b, 168a, conductor 164, wiper of stepper switch 85, contact 85-3, conductor 210, wiper of bank 86D, terminal 86D-4, conductor 211, terminal 87I-15, wiper 97, the winding of program stop relay 212, conductor 126, and over conductor 127 to ground at terminal 101. Relay 212 operates and opens its normally closed contacts 212a, thereby interrupting an energizing circuit normally completed over conductors 213 and 214 which connects together terminals 105 and 106. Such energizing circuit can be utilized to extend the operating potential from the vehicle battery (not shown) to the drive motor of the truck in conventional fashion, and by interrupting this circuit the truck is halted at the preselected station. Thus, after receiving only a single command by the manipulation of two manual selector switches when it was positioned at rest in block 54, the truck has made the proper "decision" and proceeded from the main path through secondary path 28, over the main path in block 40, made the right decisions at decision points 25 and 26, and proceeded again over the main path to arrive at and stop at station 15.

Having given the illustrative explanation for a typical operation of the truck in the layout of the invention, and with the preferred embodiment set forth in FIGURES 2A–2D, those skilled in the art will recognize that the circuitry is connected to, in effect, issue instructions as the truck approaches any of the three decision points. More specifically, as the truck approaches decision point 21 and receives the code signal characteristic of such point, the circuitry is such that the truck is instructed to turn left and enter secondary path 28 in proceeding to any of stations 11–15 and to continue straight ahead on the main path for any of the stations 1–10. At decision point 25, the circuitry is such as to instruct the truck to turn left along secondary path 30 to arrive at any of preselected stations 1–11, and to make a right turn and stay on the main path to arrive at any of stations 12–15. At decision point 26, the truck is instructed to turn right and follow secondary path 31 for station 12 only, and for any of the remaining stations to turn left and continue on the main path along outside leg 27 toward return junction 20. In an obvious manner the stepper and selector circuitry of the drawings can be increased and connected to add any desired number of stations to a layout, and to provide any desired number of alternate paths so that the equipment will make the proper decision for the truck as it approaches any point where a single path branches into two paths.

In describing the circuitry of FIGURES 2A–2D, only the more basic elements of the inventive combination have been explicitly referred to hereinabove. That is, additional circuitry such as resistor-capacitor combinations for minimizing radio interference caused by contacts opening or closure, or adjustable resistances to effect circuit adjustments, have been shown but not specifically identified. It will, however, be apparent to those skilled in the art how the Varistors 260–264, diodes 265–273, resistors 274–279, and capacitors 280–284 function in the illustrated embodiment of the invention. In addition, the connections in the station selector circuitry not explicitly identified in the typical example set out hereinabove are referenced by numerals 285–297. In similar manner the interconnection between the various terminals of the banks of right stepper switch 86 and the terminals of banks 87E–87J of stepper switch 87 to provide selective pre-marking, which have not been referred to in the typical example explained above, have been depicted by reference numerals 300–353, to enable those skilled in the art to readily practice the invention.

*Vehicle Battery Re-Charging (Charge Call)*

After a day or other preselected period of operation of a number of vehicles over a system such as described hereinbefore, if the mobile vehicles are of the electrically-operated type, the batteries of these trucks will require re-charging. Accordingly means are provided for transmitting a single command ("charge call") throughout the system which is received by each of the trucks, no matter where located, and causes each to start up and commence travelling toward a battery recharging station. As will be seen hereinafter, the truck will not respond to the charge call if stepper switch 87 is off its normal position, indicating the truck has received command information directing it to proceed to a preselected station, or if either of switches 85 and 86 is off its normal position, indicating that position information is then being received by the truck. After switches 85–87 have been returned to their normal positions, the truck can then respond to the charge call and travel to the battery re-charging apparatus. This is done in an expeditious manner, each truck avoiding collisions with the preceding trucks by means of the hold beacon system described hereinbefore.

For purposes of this explanation, it is sufficient to set out the manner in which the charge call is transmitted and received, and each truck is started up to proceed toward the battery re-charging station. In a preferred embodiment of the invention, it has been found simple and economical to install a battery-charging apparatus at each successive one of a number of hold beacons equal to the number of trucks in the particular installation. When all of the trucks respond to a "charge call" command and start to traverse the traffic layout, it is only necessary to halt one truck at the beacon farthest along the layout. The halted truck transmits a presence signal to the succeeding beacon to halt the following truck as described above, and such operation is repeated along the layout as the following trucks draw abreast of the string of beacons containing the charging apparatus. The lead truck can be stopped in different ways. For example, all of the trucks can be programmed to halt at a preselected beacon (the head beacon) in answering the "charge call" command; the first truck to arrive at such beacon is then halted, and each succeeding truck is halted as described. Alternatively a transmitter positioned in the head beacon can be keyed by the "charge call" command to radiate a "hold" signal and thus halt the lead truck.

The battery-charging apparatus in each beacon may be arranged for automatic operation, to effect connection between the charging apparatus and the battery terminals of the truck as it is halted adjacent the beacon. Such apparatus is disclosed and claimed in applicant's copending application entitled "Battery Charging System for Vehicles," filed October 1, 1959, Serial No. 843,878, and assigned to the owner of the present application. Accordingly the details of the charging apparatus itself will not be set forth herein. The manner in which the charge call signal is transmitted and utilized will now be described.

The command may be issued, by way of example, by transmitting a charge call signal over conductor 17 at a frequency different from the truck guidance frequencies; the charge call signal is detected by pick-up coil 230 (FIGURE 3), amplified by a suitable receiver and used to operate a relay or effect a similar control function. The operation of such relay can be utilized to, in effect, connect together terminals 172 and 173 in FIGURE 2D to complete an operating circuit for the winding of charge call relay 116. Accordingly relay 116 is operated over a circuit extending from positive battery at terminal 103, conductor 159, terminals 172, 173, the winding of relay 116, off-normal contacts 86b of right stepper switch 86, off-normal contacts 85b of left stepper switch 85, and over conductor 160 to ground at terminal 101.

Relay 116 operates and at its contacts 116d completes an obvious holding circuit. In addition, armature 116b (FIGURE 2A) is displaced from the position shown to engage fixed contact 116c, thereby extending positive battery from terminal 103 over conductors 118, 117, armature 116b, contact 116c, off-normal contact set 87a of stepper switch 87, to the right side of the winding of program relay 113. It is noted that if the stepper switch 87 had been displaced by inserting command information to direct the truck toward a preselected destination, off-normal contacts 87a would be open and operating potential would not be extended to the right side of relay 113 until the truck had arrived at such destination and stepper switch 87 had been returned to 0 or normal position. Armature 116h is also displaced from its illustrated position engaging fixed contact 116j to engage contact 116i, thereby extending ground from terminal 101 over conductor 127, armature 116h, and contact 116i to the left side of the winding of program relay 113. Accordingly, resposive to energization of charge call relay 116, suitable energizing potential is applied across the winding of program relay 113, displacing armature 113b from engagement with fixed contact 113a, and preventing the energization of the winding of stepper relay 87. Stepper switch 87 is thus maintained in its normal position while the trucks are returned to the battery re-charging stations.

Energization of charge call relay 116 also effects the displacement of armature 116e from its engagement with contact 116f into engagement with contact 116g, thereby extending positive battery from conductor 117 over armature 116e, fixed contact 116g, conductor 78, to the upper terminal of the winding of self-start relay 77. Ground is extended over resistor 80 to the lower terminal of the winding; accordingly self-start relay 77 operates and completes a control circiut (not shown) to energize the motor for the mobile vehicle to commence operation over the layout shown in FIGURES 1A and 1B until it is halted adjacent a hold beacon for battery re-charging.

Receipt of Control Signals

Before considering the input circuitry (FIGURE 4) which links the various detecting coils on the truck with the control circuitry of FIGURES 2A–2D, attention is again directed to the positions of certain of the coils shown in FIGURE 3. The path-detection means for receiving course-defining signals includes reference coils 225 and error coil 226, mounted near the front of the truck. The position-indicating code sigals are received over first digit code pick-up coil 227 and second digit code pick-up coil 228, disposed at the left and right sides, respectively, of truck 220. The charge call command signal is received over charge call pick-up coil 230, centrally positioned on the truck. Pick-up coil 231 is positioned at the right rear of the truck to receive both "hold" and "count defeat" signals from the signal beacons positioned adjacent the traffic layout. The truck also includes means for radiating a presence signal from block signal transmission coil 232, the only coil shown in FIGURE 3 which is utilized to transmit rather than to receive signals.

Considering the positions of the various coils, it is apparent that at least with respect to those pick-up coils positioned directly over guide wire 17, the signals picked up or transmitted should be received or transmitted at different frequencies to insure correct response to the various commands. Accordingly course-defining signals were transmitted at a frequency of 7 kc. to indicate the main path ($f_1$) and at a frequency of 11 kc. ($f_2$) to delineate the secondary paths in one embodiment of the invention; code pick-up coils 227 and 228 also picked up signals of the same frequencies. However, because of the placement of coils 227 and 228 considerably to the left and right of the central axis of the truck, these coils respond only to signals transmitted from the left and right position-indicating loops, even though these signals are of the same frequency as that of the course-defining signals transmitted over the guide wire. When the truck is switched onto one of the secondary paths of the layout, and the reference and error coils receive signals of a different frequency, the first and second digit pick-up coils can also pick up signals of the different frequency so that energization of the code pick-up coils is greatly simplified.

Although particular frequencies are given for explanatory purposes, it is evident that any frequencies within reason may be used for $f_1$ and $f_2$, so long as the different-frequency signals can be separated in the receiving equipment on the truck. With certain configurations of the traffic layout it is possible, because of mutual coupling, that some $f_1$ signals will be found in the secondary path and some $f_2$ signals will be present on the main path. Erroneous indications are avoided by providing sufficient selectivity of the tuned circuit receiving system on the truck so that a signal of the undesired frequency is rejected. If the selectivity cannot be made as high as desired, additional frequency-rejection circuits can be added to the guide wire along the traffic layout. An alternative to such frequency-rejection circuits is the provision of a negative mutual coupling (for example, by a variable transformer) to couple equal but opposite signals between the two systems, thus cancelling out the undesired coupling.

In the constructed embodiment the presence signal transmitted from the truck over coil 232 to the loop in the block traversed by the truck included a 200 kc. carrier signal modulated by a 2 kc. signal. The charge call command was transmitted to pick-up coil 230 at a frequency of 8.5 kc. The hold or count defeat signals re-radiated from the signal beacons essentially comprised the 2 kc. modulation of the presence signal. These frequencies are given by way of illustration only, and in one embodiment of the invention actually constructed and operated, it was found that transmission of the various commands could be received and distinguished by the trucks at these frequency separations with no mistake in the operation of the system.

Although in the illustrated embodiment a presence signal is transmitted from the truck to a loop in the block traversed by the truck, it is apparent that passive means may also be incorporated on the truck to identify vehicles at various points of the traffic layout. That is, the magnetic field from a permanent magnet mounted on the tractor, or the fields from a group of magnets arranged in a particular spatial code, could be detected by a sensing means of the fixed system. Alternatively, the truck may carry a resonant circuit operative to detune a corresponding circuit in fixed system for identification purposes. Another identification system might utilize pressure-sensitive switches positioned in the floor of the installation at the points traversed by the truck wheels, thus to identify truck position.

With the foregoing review of the pick-up coils and description of the signal frequencies, the input circuits connected to such coils will now be described.

As shown in FIGURE 4, block beacon transmitter unit 233 produces a 200 kc. signal modulated at 2 kc.; this signal is coupled to block signal transmission coil 232, whence it is transmitted by the truck for receipt by the loop buried within each block to be relayed to its respective hold beacon.

Reference coil 225 and error coil 226 are positioned within magnetic sensing unit 255, and are respectively coupled to circuits 234 and 235 within sense tuning switch box 236. Coil 225 forms a tuned circuit with the components of circuit 234, and coil 226 also forms a tuned circuit with the components of circuit 235. Output signals from the tuned circuits are applied to the guidance circuits, which circuits together with the reference and error coils and the manner in which the guidance signals are developed and utilized, are described and explained in detail in the above-identified De Liban application.

A first relay disposed within sense tuning switch box 236 includes a winding 237 which, when energized, opens its associated contact set 237a to change the parameters of the tuned circuit including reference coil 225. Such an operation is required when the frequency response of the path-detection means of the truck is adjusted, for example, by tuning same to receive a course-defining signal of 11 kc. ($f_2$) rather than a signal of 7 kc. ($f_1$) in switching the truck from the main path to one of the secondary paths. In similar fashion a second relay includes a winding 238 and a contact set 238a connected to alter the parameters of the tuned circuit including error coil 226 when energized in similar fashion, so that each of the tuned circuits is altered to have its maximum response at the proper signal frequency as the mobile vehicle is either switched from the main path to a secondary path or re-enters the main path after traversing one of the secondary paths in the layout. The windings 237 and 238 are connected in parallel, and one side of the parallel connection is connected to ground at terminal 101 in the stepper panel (see also FIGURE 2D). The other side of each relay winding is connected to terminal 102 in the same panel, so that the relays are actuated whenever the stepper panel equipment responds to an operating signal to cause the truck to switch from the main path to one of the secondary paths.

More specifically, reference coil 225 is coupled to one plate of each of capacitors 256, 257 and 258. The other plate of capacitor 258 is coupled to one side of fixed capacitor 260, the other plate of which is coupled to ground. The plates of capacitors 256 and 257 remote from reference coil 225 are coupled over contact set 237a to ground; this contact set is opened when winding 237 is energized. Accordingly the tuned reference signal circuit for responding to $f_1$ signals comprises reference coil 225 and capacitors 256, 257, 258 and 260. The circuitry of FIGURE 4 is in the position shown for sensing a course signal transmitted at 7 kc. or frequency $f_1$. The tuned circuit can be "peaked" by adjustment of variable capacitor 256 to effect a maximum response at frequency $f_1$. When the truck is switched to a secondary path, a relay-operating signal is received from terminal 102 in the stepper panel and winding 237 is energized to open contact set 237a, thereby removing (in effect) capacitors 256 and 257 from the tuned circuit including reference coil 225. Accordingly variable capacitor 258 can be adjusted to "peak" the circuit for response at $f_2$ or 11 kc., or at any other frequency chosen as a course-defining reference for the secondary paths of the layout.

In like manner error coil 226 is coupled to one side of each of capacitors 262, 263 and 264, and the other side of capacitor 264 is coupled over fixed capacitor 265 to ground. Capacitors 262 and 263 are connected in parallel, between error coil 226 and contact set 238a which is operated when relay winding 238 is energized. Windings 237 and 238 are coupled in parallel for concomitant actuation to simultaneously change the parameters of the reference and error tuned circuits to thereby alter the response characteristics of the sensing or path-detection means, including magnetic sensing unit 255 and sense tuning switch box 236, which picks up the course-defining signals from the guide wire.

First digit code pick-up coil 227 is coupled through an amplifier 240 and a relay winding 241 to a source of unidirectional operating potential; when the first digit pick-up coil receives a signal from a loop to the left of the guide wire, it is amplified and used to energize winding 241 to close associated contact set 241a, which effectively couples together contacts 153 and 154 in the stepper panel. As shown in FIGURE 2D, this control operation effectively energizes the winding of left loop relay 157, to effect the various control functions described hereinbefore.

In a related fashion second digit code pick-up coil 228 is coupled through an amplifier 243 and a relay winding 244 to the source of unidirectional operating potential, so that receipt of a signal from a loop to the right of the guide wire effectively energizes winding 244 and closes its associated contact set 244a. This operation effectively couples together terminals 155 and 156 in the stepper panel, to energize the winding of right loop relay 158 and effect the control action described hereinbefore.

In the lower part of FIGURE 4, the coupling of charge call pick-up coil 230 through an amplifier 246 and relay winding 247 to actuate an associated contact set 247a, and the coupling of beacon hold pick-up coil 231 through an amplifier 250 and relay winding 251 to a potential source to effect closure of associated contact set 251a, are both obvious from the foregoing explanation. When relay winding 247 is energized to close contact set 247a, terminals 172 and 173 in the stepper panel are effectively connected together to complete an operating circuit for the winding of charge call relay 116. When relay winding 251 is energized to close contact set 251a, terminals 175 and 176 in the stepper panel are effectively connected together to energize the winding of count defeat relay 168, and also to energize the winding of beacon hold relay 170 if both stepper switches 85 and 86 are in the normal position. All of the operating circuitry shown in either of the blocks 253 or 254 connected between the pick-up coils and the terminals in the stepper relay may be included in a dual channel receiver, which itself may comprise both the preamplifier and amplifier arrangement for effecting relay operation.

*Conclusion*

It is therefore manifest that the invention provides an expeditious and positive system for ordering and controlling the travel of mobile vehicles along a traffic layout so that any vehicle can be instructed by a single command to start up and proceed to a preselected station, and to halt at such station. In traversing a complicated traffic layout including a main path and a plurality of secondary paths, each time the vehicle approaches a divergence or decision point in the layout it automatically determines and follows the shorter route to its preselected station. When following the various commands and traversing the traffic layout, the truck picks up signals from various loops or location identification means positioned along the path to provide position information in determining the shorter route and arrival at the station. In the event that congested traffic conditions are present on a secondary path which ordinarily would be followed in travelling to the station, the signal indicating that the secondary path should be followed is countermanded and the truck is caused to remain on the main path of the system to avoid such undesirable traffic conditions. At the end of a period of operation, the issuance of a single command signal is effective to start each truck in operation to pull alongside one of the hold beacons, which beacons also serve as the battery re-charging stations. A protective block arrangement prevents rear-end collisions caused by one truck following another too closely. The material handling capabilities and labor-saving advantages of such a guidance system are manifest.

Although only a particular embodiment of the invention has been shown and described, it is apparent that modifications and alterations may be made therein, and it is intended in the appended claims to cover all such modifications and alterations as may fall within the true spirit and scope of the invention.

What is claimed is:

1. A guidance system for a traffic layout including a plurality of interconnected traffic paths comprising: path defining means for defining each of said traffic paths including a plurality of location identification points spaced apart along said paths and a plurality of stations respectively positioned at said points; at least one mobile unit including path-detection means on said unit for sensing the location of the path defining means and directing the unit along said paths in said traffic layout, and a control system on said unit comprising preselection means for providing command information instructing said unit to proceed from an initial position along said traffic layout to a preselected one of said stations, means for providing position information indicative of unit location as the unit passes said location identification points along the traffic layout, comparison means including means for comparing said command information with said position information to determine the preferred route from at least different ones of the points to said preselected station, and control means operative to control said unit in traversing the traffic layout according to regulating signals received from said comparison means.

2. A guidance system for a traffic layout including a plurality of interconnected traffic paths comprising: path defining means for said traffic paths including a plurality of location identification points spaced apart along said paths and a plurality of stations respectively positioned at said points; at least one mobile unit including path-detection means for sensing said path defining means to direct the unit along said traffic layout, and a control system on said unit comprising preselection means for providing command information instructing said unit to proceed from an initial position along said traffic layout to a preselected one of said stations, means for providing position information indicative of unit location as the unit passes said location identification points along the traffic layout, comparison means including means for comparing said command information with said position information to recognize arrival of the unit at the preselected station, and control means operative to halt the unit at the preselected station responsive to receipt of a regulating signal from said comparison means.

3. A guidance system for a traffic layout including a plurality of interconnected traffic paths along which a plurality of stations are positioned including: path defining means for defining the paths, a plurality of location identification points spaced apart along said paths including said stations; at least one mobile unit including path-detection means for sensing said path defining means to direct the unit along said traffic layout, and a control system on said unit comprising preselection means for providing command information instructing said unit to proceed to a preselected one of said stations, sensing means for receiving said location-identifying signals responsive to movement of the unit adjacent different location identification points, register means coupled to said sensing means for storing said position information, information comparison means coupled to said preselection means and to said register means for comparing said command information with said position information to determine the preferred route to said preselected station from at least certain of said location identification points, and control means coupled to said information comparison means operative to control said unit in following said preferred route to said preselected station according to regulating signals received from said information comparison means.

4. A guidance system for a traffic layout including a plurality of interconnected traffic paths along which a plurality of stations are positioned including: path defining means for defining each of said traffic paths, means for providing location-identifying signals at a plurality of location identification points spaced apart along said paths including said stations; at least one mobile vehicle including path-detection means for sensing said path defining means for use in directing the vehicle along said traffic layout, and a control system on said vehicle comprising preselection means for providing command information instructing said vehicle to proceed to a preselected one of said stations, sensing means for receiving said location-identifying signals responsive to movement of the vehicle adjacent different location identification points, register means coupled to said sensing means for storing said position information, information comparison means coupled to said preselection means and to said register means for comparing said command information with said position information to determine when the vehicle has arrived at the preselected station, and control means coupled to the information comparison means operative in accordance with a regulating signal received therefrom to halt the vehicle at the preselected station.

5. A guidance system including: a guide wire defining a traffic layout including a plurality of interconnected traffic paths, a plurality of location-identification points spaced apart along said paths, each point including at least one conductive loop displaced laterally of and connected to the guide wire to determine a signal in the digital code which is characteristic for each point, the loops at each point being disposed to provide signals of different digital values than the digital values provided by the loops at other points, a plurality of stations each of which is respectively positioned at a different one of said points, means for energizing said guide wire to provide course-defining signals along said wire and to also provide location-defining signals in a digital code at said location-identification points, and at least one mobile vehicle including means for sensing the location-defining signals in said digital code, and digital responsive means on said vehicle including means controlled by said sensed digital code signals to select the preferred route for further travel by the vehicle.

6. A guidance system including: a guide wire defining a traffic layout including a plurality of interconnected traffic paths, a plurality of location-identification points spaced apart along said paths, each point including at least one conductive loop formed by displacing the guide wire to one side of a traffic path, the number of such loops and their positions relative to said traffic path determining a unique digital code signal identifying each point, the loops at each point being arranged to provide a code signal having a different digital value than the signals provided at the other points in the system, a plurality of stations, each of which is respectively positioned at a different one of said points, means for energizing said guide wire to provide course-defining signals along the wire, and location-defining code signals at said location identification points, and at least one mobile vehicle comprising means for sensing the course-defining signals, means for sensing the location-defining code signals, and digital responsive means controlled by said digital code signals to select the preferred route for travel by the vehicle to a further point in the system.

7. A guidance system including: a guide wire defining a traffic layout including a plurality of interconnected traffic paths, a plurality of location-identification points spaced apart along said paths, each point including a plurality of conductive loops positioned to the left and right sides of the guide wire and connected thereto, the number of such loops and their positions relative to a traffic path determining a unique code signal identifying each point, the position and number of loops for different stations being arranged to provide a signal having a different digital value than the code signal provided at the other points in the system, a plurality of stations, each of which is respectively positioned at a different one of said points, means for energizing said guide wire to provide course-defining signals along the wire and location defining code signals at the location-identification points, and at least one mobile vehicle comprising a first means positioned on said vehicle for sensing the course-defining signals to provide heading information, and second and third means on said vehicle laterally displaced relative to each other and said first means for sensing the location defining signals, and digital responsive means on said vehicle controlled by said sensing means to select a preferred route for further travel by the vehicle.

8. A guidance system according to claim 7 in which said conductive loops at each location-identification point are positioned in three groups longitudinally along a traffic path, the first group being positioned laterally of the guide wire to one side thereof, the second group being positioned laterally of the guide wire to the other side thereof, the first and second groups together determining a code signal representative of the position of the location-identification point, and the third group including a pair of loops one of which is positioned to each side of the guide wire to provide a readout signal for a vehicle after the position information embodied in the first and second groups has been detected by such vehicle.

9. In a guidance system including guide means for defining the paths of a traffic layout including a plurality of interconnected traffic paths, a plurality of stations and a plurality of location identification points spaced apart along said paths to provide location-defining code signals thereat; at least one mobile vehicle, a control system for said vehicle including comparison means for comparing command information indicative of a preselected station with position information indicative of each location identification point as the vehicle approaches such point comprising means operative to provide a steering signal representative of the preferred route from such point to the preselected station and means operative to provide a stopping signal responsive to arrival at the preselected station, a first control means coupled to said comparison means operative responsive to receipt of said steering signal to control the vehicle in following the preferred route to the preselected station, and a second control means coupled to said comparison means operative responsive to receipt of said stopping signal to halt the vehicle at said preselected station.

10. A guidance system including: guide means for defining a main path and a secondary path in a traffic layout, said secondary path diverging from said main path at a decision point, a plurality of stations positioned along said layout, a plurality of location identification points spaced apart along said layout for providing a unique code signal at said decision point and at each of said stations; at least one mobile vehicle including a control system comprising preselection means for providing command information instructing said vehicle to proceed past said decision point to a preselected one of said stations, means including a register for receiving the code signal identifying said decision point as the vehicle approaches same, comparison means for comparing said command information with said position information, means for so pre-marking said comparison means that as the position information identifying the decision point is received and compared to the command information identifying the preselected station, the preferred route from the decision point to such station is automatically determined and indicated by a steering signal, and control means coupled to said comparison means for controlling said vehicle in accordance with said steering signal to traverse the preferred route beyond said decision point as determined by the comparison means.

11. A guidance system including: guide means for defining a traffic layout, a plurality of stations positioned along said layout, a plurality of location identification points spaced apart along said layout for providing a unique code signal at each of said stations; at least one mobile vehicle including a control system comprising preselection means for providing command information instructing said vehicle to proceed to a preselected one of said stations, means including a register for receiving the code signal identifying each location identification point as the vehicle approaches same, comparison means for comparing said command information with said position information, means for so pre-marking said comparison means that as the code signal identifying the preselected station is received and compared to the command information identifying such station, arrival of the vehicle at such station is indicated by a stopping signal, and control means coupled to said comparison means for controlling said vehicle in accordance with said stopping signal to halt the preselected station.

12. In a guidance system including guide means defining a traffic layout including a plurality of interconnected traffic paths, a plurality of stations and a plurality of location-identification points spaced apart along said paths to provide location-defining code signals thereat; at least one mobile vehicle including means for directing such vehicle along the traffic layout and a control system for the vehicle comprising station preselection means including a first switching means manually actuable to provide command information instructing said mobile vehicle to proceed to a preselected one of said stations, sensing means for detecting said code signals as the vehicle traverses said traffic layout, register means including a second switching means coupled to said sensing means for providing position information indicating the location of the vehicle in its traversal of the traffic layout, a third switching means including first and second sets of contact banks, the first set being coupled to said first switching means to comprise therewith the station preselection means, information comparison means including said second set of banks, said first and second sets of banks being controlled in unison to apply the command information to said comparison means, means for intercoupling the register means and the information comparison means to provide a stopping signal upon arrival of the vehicle at said preselected station, and a fourth switching means coupled to said information comparison means for halting the vehicle upon arrival at said preselected station.

13. In a guidance system including guide means defining a traffic layout including a plurality of interconnected traffic paths, a plurality of stations and a plurality of location-identification points spaced apart along said paths to provide location-defining code signals thereat; at least one mobile vehicle including means for directing such vehicle along the traffic layout and a control system for the vehicle comprising station preselection means including a first switching means manually actuable to provide command information instructing said mobile vehicle to proceed to a preselected one of said stations, sensing means for detecting said code signals as the vehicle traverses said traffic layout, register means including a second switching means coupled to said sensing means for providing position information indicating the location of the vehicle in its traversal of the traffic layout, a third switching means including first and second sets of contact banks, the first set being coupled to said first switching means to comprise therewith the station preselection means, information comparison means including said second set of banks, said first and second sets of banks being controlled in unison to apply the command information to said comparison means, means for intercoupling the register means and the information comparison means to provide steering signals indicative of the shortest route to said preselected station, and a fourth switching means coupled to said information comparison means for directing the vehicle along said shortest route.

14. In a guidance system including guide means arranged to define a traffic layout including a main path and a secondary path which diverges from the main path at a decision point, a plurality of stations and a plurality of location-identification points spaced apart along said layout to provide location-defining code signals for said decision point and said stations: at least one mobile vehicle including means for sensing the guide means and directing such vehicle along the traffic layout, and a control system for the vehicle comprising station preselection means including a first switching means manually actuable to provide command information instructing said mobile vehicle to proceed past said decision point to a preselected one of said stations, sensing means for detecting said code signals as the vehicle traverses said traffic layout, register means including a second switching means coupled to said sensing means for providing position information indicating the location of the vehicle in its traversal of the traffic layout, a third switching means including first and second sets of contact banks, the first set being coupled to said first switching means to comprise therewith the station preselection means, information comparison means including said second set of banks, said first and second set of banks being controlled in unison to insert the command information on said comparison means, means for intercoupling the register means and the information comparison means to provide steering signals indicative of the shortest route from said decision point to said preselected station and a stopping signal upon arrival at such station, and a fourth switching means coupled to said information comparison means for directing the vehicle along said shortest route in accordance with said steering signals and for halting the vehicle upon arrival at said preselected station in accordance with said stopping signal.

15. A guidance system including a traffic layout having a main path and a secondary path diverging from said main path at a decision point, location-identification means positioned at a number of points in said system including said decision point for providing a unique code signal thereat, said location-identification means at each of said points being connected to provide a signal thereat which is different than the signal provided at other points in the traffic layout, a first mobile vehicle positioned on said main path for travel to a preselected station beyond said decision point including control means having sensor means operative to sense the information provided by identification means at said decision point, means for comparing information indicative of a preselected station with the location provided by the sensor means, and means operative to provide a steering signal representative of the preferred route from said identified decision point to said preselected station; traffic control means comprising a signal-detection portion disposed at a preassigned position on the preferred path to receive a presence signal from a second mobile vehicle positioned thereat, and a signal-radiating portion coupled to said signal-detection portion and positioned adjacent said decision point to radiate the presence signal to said first vehicle as received from said second vehicle, and means on said first vehicle for utilizing said presence signal to over-ride the steering signal in the selection of a path other than the preferred path only when the steering signal would otherwise direct said first vehicle to enter the secondary path and encounter a congested traffic condition thereat.

16. A guidance system according to claim 15 in which the signal-detection portion of the traffic control means has a reference position spaced from the secondary path by a given distance in a given direction to receive a presence signal from the second vehicle, and the signal-radiating portion is differently positioned with respect to the main path to radiate a presence signal to the first vehicle, the different positions of the signal-detection and signal-radiating portions preventing spurious indications of vehicle location along the system.

17. A guidance system including means for radiating signals of a first frequency defining a main path and signals of a second frequency defining at least a portion of a secondary path in a traffic layout, said secondary path diverging from said main path at a decision point, a plurality of stations positioned along said layout, a plurality of location-identification means for providing a code signal at said decision point and at each of said stations, a first vehicle positioned on said main path for travel to a preselected station beyond said decision point including control means having sensor means operative to sense the information provided by each identification means at each decision point, means for comparing information indicative of a preselected station with position information provided by said sensor means, frequency responsive means having a frequency-response characteristic adjustable to respond substantially only to signals of one of said first and second frequencies to thereby control said vehicle to follow an alternative one of said main and secondary paths, and means responsive to receipt of a code signal at one point, at least, operative to provide a steering signal to control said frequency responsive means to adjust to the one of the frequencies which represents the preferred route from the decision point identified by the code signal to said preselected station, traffic control means comprising a signal detection portion disposed at a preassigned position on one of said paths to receive a presence signal from a second vehicle positioned thereat, a signal radiating portion coupled to said signal detection portion and positioned adjacent said decision point to radiate the presence signal as received from said second vehicle, and means on said first vehicle operative responsive to receipt of said presence signal to over-ride the steering signal only when the steering signal would otherwise adjust said frequency-responsive means to respond to signals of a frequency which directs said one vehicle to enter a path which has a congested traffic condition.

18. A guidance system for a traffic layout having a plurality of stations including means for radiating signals of a first frequency defining a main path and signals of a second frequency defining at least a portion of a secondary path in said traffic layout, said secondary path diverging from said main path at a decision point, identification means including means for identifying said decision point and said stations with a signal, at least one mobile vehicle including means operable to determine the identity of the decision point responsive to movement of the vehicle adjacent thereto, and means operative responsive to said signals to select a preferred one of the paths of several paths which extend from said decision point to a desired station, path-detection means adjustable to sense signals of only one of said first and second frequencies at a time, means on said vehicle for adjusting said path-detection means to respond substantially only to signals of the second frequency to cause said vehicle to leave the main path at said decision point and traverse said secondary path whenever said means on said vehicle select the secondary path as the preferred path, transmitter means operative to transmit a signal indicating presence of the vehicle on said secondary path, count defeat means positioned adjacent said decision point operative responsive to said signal to indicate the presence of a vehicle on said secondary path, and means operative responsive to receipt of said count defeat signal to readjust the path-detection means on the one vehicle to respond substantially only to signals of the first frequency and thus control said vehicle to follow the main path.

19. A guidance system for a traffic layout including a plurality of interconnected traffic paths comprising: path defining means for defining each of said traffic paths including a plurality of location identification points spaced apart along said paths, and a plurality of stations respectively positioned at said points including identification means at each of said location identification points, each of which identification means provides a different coded identification signal; at least one mobile unit including path-detection means for sensing the location of said path-defining means and directing the unit along said traffic layout, and a control system for said unit comprising preselection means for providing command information instructing said unit to proceed from an initial position along said traffic layout to a preselected one of said stations, means controlled by said coded identification signals to provide position information indicative of unit location as the unit passes each of said location identification points along the traffic layout, comparison means including means for comparing said command information with said position information which identifies the location of the vehicle to determine the preferred route of several routes which extend from at least one of the points in said system toward said preselected station, and control means operative to control said unit in traversing the traffic layout according to the preferred route determined by said comparison means.

20. A guidance system for a traffic layout including a plurality of interconnected traffic paths comprising: path defining means for each of said traffic paths including a plurality of location identification points spaced apart along said paths, and a plurality of stations respectively positioned at said points including identification means at each of said location identification points, each of which identification means provides a different coded identification signal; at least one mobile unit including path-detection means for sensing said path-defining means to direct the unit along said traffic layout, and a control system for said unit comprising preselection means for providing command information instructing said unit to proceed from an initial position along said traffic layout to a preselected one of said stations, means controlled by said coded identification signals to provide position information indicative of unit location as the unit passes said location identification points along the traffic layout, comparison means including means for comparing said command information with said position information, and means for providing a regulating signal responsive to recognition of arrival of the unit at the preselected station, and control means operative to halt the unit at the preselected station responsive to receipt of said regulating signal from said comparison means.

21. A guidance system for a traffic layout including a plurality of interconnected traffic paths along which a plurality of stations are positioned including path defining means for defining each of the paths, a plurality of location identification points spaced apart along said paths including said stations, identification means at each of said location identification points, each of which identification means provides a different coded identification signal; at least one mobile unit including path-detection means for sensing said path defining means to direct the unit along said traffic layout, and a control system for said unit comprising preselection means for providing command information instructing said unit to proceed to a preselected one of said stations, sensing means for receiving said different location-identifying code signals responsive to movement of the unit adjacent different location identification points, register means coupled to said sensing means for storing the position information represented by said code signals, information comparison means coupled to said preselection means and to said register means for comparing said command information with said position information to determine the preferred route of several routes from said position to said preselected station, and control means coupled to said information comparison means operative to control said unit to follow said preferred route to said preselected station according to regulating signals received from said information comparison means.

22. A guidance system for a traffic layout including a plurality of interconnected traffic paths along which a plurality of stations are positioned including: path defining means for defining each of said traffic paths, means for providing location-identifying signals at a plurality of location identification points spaced apart along said paths including said stations; said identification means at different stations being operative to provide a different location identifying signal, at least one mobile vehicle including path-detection means for sensing said path defining means for use in directing the vehicle along said traffic layout, and a control system for said vehicle comprising preselection means for providing command information instructing said vehicle to proceed to a preselected one of said stations, sensing means for receiving said location-identifying signals responsive to movement of the vehicle adjacent different location identification points, register means coupled to said sensing means for storing said position information, information comparison means coupled to said preselection means and to said register means including means for comparing said command information with said position information and means for providing a regulating signal when the vehicle has arrived at the preselected station, and control means coupled to the information comparison means operative in accordance with said regulating signal to halt the vehicle at the preselected station.

23. In a guidance system including guide means for defining the paths of a traffic layout including a plurality of interconnected traffic paths, a plurality of stations and a plurality of location identification points spaced apart along said paths to provide location-defining code signals thereat including identification means at each of said location identification points, each of which identification means provides a different coded identification signal; at least one mobile vehicle, sensor means on said vehicle for sensing said paths, means for registering the identity of a selected station, comparison means for comparing the identity of the preselected station with position information provided at each location identification point as the vehicle approaches the point, including means operative to provide a steering signal representative of the preferred path from such point to the preselected station, and means operative to provide a stopping signal responsive to arrival of the vehicle at the selected station, a first control means coupled to said comparison means operative responsive to receipt of said steering signal to control said sensor means in following the preferred path to the preselected station, and a second control means coupled to said comparison means operative responsive to receipt of said stopping signal to halt the vehicle at said preselected station.

24. A guidance system including: guide means for defining a main path and a secondary path in a traffic layout, said secondary path diverging from said main path at a decision point, a plurality of stations positioned along said layout, a plurality of location identification points spaced apart along said layout, each of which includes means for providing a unique code signal at said decision point and at each of said stations; at least one mobile vehicle, a control system for said vehicle comprising preselection means for providing command information instructing said vehicle to proceed past said decision point to a preselected one of said stations, means including a register for receiving the code signal identifying said decision point as the vehicle approaches same, comparison means for comparing said command information with said position information, means for so pre-marking said comparison means that as the position information identifying the decision point is received and compared to the command information identifying the preselected station, the preferred route from the decision point to such station is automatically determined and indicated by a steering signal, and control means coupled to said comparison means for controlling said vehicle in accordance with said steering signal to traverse the preferred route beyond said decision point as determined by the comparison means.

25. A guidance system including: guide means for defining a traffic layout, a plurality of stations positioned along said layout, a plurality of location identification points spaced apart along said layout including means at each station for providing a unique code signal, the code at each of said stations being different than the codes at other stations; at least one mobile vehicle, a control system for said vehicle comprising preselection means for providing command information instructing said vehicle to proceed to a preselected one of said stations, means including a register for receiving the code signal identifying each location identification point as the vehicle approaches same, comparison means for comparing said command information with the position information provided by the unique code signal for said point, means for so pre-marking said comparison means that as the code signal identifying the preselected station is received and compared to the command information identifying such station, arrival of the vehicle at such station is indicated by a stopping signal, and control means coupled to said comparison means for controlling said vehicle in accordance with said stopping signal to halt at the preselected station.

26. A guidance system for a traffic layout including a plurality of interconnected traffic paths comprising: path defining means for defining each of said traffic paths including a plurality of location identification points spaced apart along said paths, at least one of said points being a decision point located at the intersection of a plurality of said paths, identification means at each of said location identification points, each of which provides a point identification signal; at least one mobile unit including path-detection means for sensing the location of said path defining means and directing the unit along said traffic layout, and a control system for said unit comprising preselection means for providing command information instructing said unit to proceed from an initial position along said traffic layout to a preselected one of said stations, means controlled by said identification signal to provide position information indicative of the mobile unit location as the unit reaches said decision point along the traffic layout, comparison means including means for comparing said command information with said position information which identifies the location of the unit, and means for selecting the preferred one of the paths of the several paths which extends to said preselected station from said decision point, and control means for controlling said unit to traverse the one of the paths selected by said comparison means.

27. A guidance system as set forth in claim 26 in which said comparison means includes signal means operative to provide a signal responsive to the point identified by said command information and said position information being identical, and means controlled by said signal to halt said mobile unit.

28. A guidance system as set forth in claim 26 in which said layout includes traffic control blocks, signalling means for signalling the presence of one mobile unit in one of said blocks to a second mobile unit in a second one of said blocks behind said one block in the layout, and means for halting said second mobile unit in its second block responsive to said signalling.

29. A guidance system as set forth in claim 26 in which said layout includes means for signalling the presence of an obstruction in the path selected by said comparison means, and means for controlling said mobile unit to traverse a different one of said paths from said decision point.

30. A guidance system as set forth in claim 26 in which said paths at said decision point include a first path located for energization by a first frequency and a second path located for energization by a second frequency, and said control means include means for selectively controlling said path detection means to sense said first and second frequencies at different times.

31. A guidance system as set forth in claim 26 in which each of said identification means includes means for providing signals in a digital code, the digital code for each decision point in the layout being different.

32. A guidance system for a plurality of vehicles, each of which includes a signal transmitting unit thereon, comprising: a traffic layout divided into a plurality of traffic-control blocks, portection means for at least one block including a signal-detection portion disposed to receive signals transmitted by said signal transmission means on a vehicle responsive to movement of the vehicle into said block and a signal-radiating portion positioned adjacent at least a portion of a different block for radiating the signals received from said vehicle which is adjacent said one block, and means on each vehicle operative to halt an approaching vehicle in its movement adjacent the signal-radiating portion in said different block during the period that another vehicle is transmitting a signal to the signal-detection portion in said one block.

33. A guidance system for a plurality of vehicles, each of which includes a signal transmitting unit thereon, comprising: a traffic path divided into a plurality of traffic-control blocks, a protection means for each block comprising a single-conductor loop including a signal-detection portion disposed in one of said blocks to receive signals transmitted by said signal transmitting means on a vehicle responsive to movement of the vehicle into said one block, a signal-radiating portion positioned adjacent at least a portion of a different block for radiating the signal received from said vehicle which is adjacent said one block, and a portion inter-coupling said signal-detection portion and said signal-radiating portion, and means on each vehicle operative to halt the vehicle adjacent the signal-radiating portion in said different block as long as a signal is being transmitted from a preceding vehicle over the signal-detection portion of the protection means in a preceding block for reception by a vehicle in a subsequent block.

34. A guidance system according to claim 33 in which the signal-detection portion of each protection means is displaced laterally from the traffic path in a given direction by a given amount to a reference position relative to the traffic path, and the signal-radiating portion is displaced laterally from the traffic path to a position other than said reference position, the different relative positions of said portions effectively precluding false signal indications in the traffic-control blocks.

35. A guidance system comprising: a plurality of vehicles each of which includes signal transmitting means for transmitting a presence signal from a first area on the vehicle, propulsion means, and means for de-energizing said propulsion means and halting the vehicle responsive to receipt of a presence signal at a second area of the vehicle; a traffic layout divided into a plurality of traffic-control blocks, protection means for one of said blocks including a signal-detection portion disposed to receive presence signals transmitted from said first vehicle area on a vehicle responsive to movement of a first vehicle into said one block, and a signal-radiating portion positioned adjacent at least a portion of a different block to radiate presence signals adjacent the second area of a second vehicle as received from said signal-detection portion and said first vehicle, whereby the second vehicle is halted adjacent the signal-radiating portion as long as the first vehicle is transmitting a presence signal to the signal-detection portion of the protection means.

36. In a guidance system including a traffic path defined by a guide means, at least one mobile vehicle including energization means and drive means for controlling said vehicle to follow said guide means, at least one charging station for replenishing the energization means of the vehicle positioned adjacent the traffic path, a control system comprising means for transmitting a command signal, starting means on said vehicle operative to interconnect the energization means and drive means to propel the vehicle along the traffic path responsive to receipt of said command signal, and means operative to recognize arrival of the vehicle at said charging station including means for halting the vehicle adjacent the station to replenish the vehicle energization means.

37. In a guidance system including a traffic path defined by a guide means, a number of mobile vehicles including energization means and drive means, a like number of charging stations for replenishing the energization means of the vehicles positioned at intervals adjacent the traffic path, a control system comprising means for applying a command signal over said guide means, starting means on each vehicle operative to interconnect the energization means and drive means to propel each vehicle along the traffic path responsive to recept of said command signal, and means for recognizing arrival of the vehicles at said charging stations including means for halting the vehicles at corresponding intervals adjacent thereto for replenishing the vehicle energization means.

38. A guidance system comprising: a traffic layout defined by a guide wire, a plurality of traffic-control blocks, protection means for each block including a signal-detection portion disposed to receive presence signals responsive to movement of a vehicle into said block and a signal-radiating portion coupled to said signal-detection portion and positioned adjacent at least a portion of a different block, a given number of battery-charging stations disposed at intervals along said layout and positioned adjacent the signal-radiating portions of consecutive ones of said block protection means; and a number of mobile vehicles equal to said given number each including battery means, motor means, starting means for intercupling said battery and motor means to propel said vehicles along the traffic path responsive to receipt of a charge call signal over said guide wire, means for radiating a presence signal for receipt by the signal-detection portion of the protection means in which the truck is positioned, and stopping means on each vehicle operative to disconnect the battery and motor means and halt the vehicle responsive to receipt of a presence signal from the signal-radiating portion of a block protection means indicating a preceding vehicle is positioned in the block ahead; and means for applying a charge call command over said guide wire to cause each of said vehicles to start up and proceed around the traffic layout until they are halted adjacent the battery-charging stations.

References Cited in the file of this patent
UNITED STATES PATENTS

| | | |
|---|---|---|
| 2,317,400 | Paulus et al. | Apr. 27, 1943 |
| 2,753,550 | Treharne | July 3, 1956 |
| 2,847,080 | Zworykin et al. | Aug. 12, 1958 |
| 3,039,554 | Hosking et al. | June 19, 1962 |